United States Patent [19]

Lucas

[11] Patent Number: 5,020,977
[45] Date of Patent: Jun. 4, 1991

[54] STANDING WAVE COMPRESSOR

[76] Inventor: Timothy S. Lucas, 4614 River Mill Ct., Glen Allen, Va. 23060

[21] Appl. No.: 380,719

[22] Filed: Jul. 12, 1989

Related U.S. Application Data

[63] Continuation-in-part of Ser. No. 256,322, Oct. 11, 1988, abandoned.

[51] Int. Cl.⁵ .............................................. F04B 35/00
[52] U.S. Cl. ..................................... 417/322; 417/557
[58] Field of Search ............... 417/240, 241, 322, 557, 417/53

[56] References Cited

U.S. PATENT DOCUMENTS

| | | | |
|---|---|---|---|
| 2,050,391 | 8/1936 | Spencer | 417/52 |
| 3,266,438 | 8/1966 | Savage | 417/208 |
| 3,361,067 | 1/1968 | Webb | 417/240 |
| 3,657,930 | 4/1972 | Jacobson | 417/240 |
| 3,743,446 | 7/1973 | Mandroian | 417/240 |
| 3,898,017 | 8/1975 | Mandroian | 417/209 |
| 4,516,916 | 5/1985 | English et al. | 417/902 X |

OTHER PUBLICATIONS

Thermal and Acoustic Effects Attending Absorption of Microwaves by Gases, by W. D. Hershberger, RCA Review vol. 7 No. 3 pp. 429-430 Sep. 1946.

Primary Examiner—Leonard E. Smith
Assistant Examiner—Eugene L. Szczecina, Jr.
Attorney, Agent, or Firm—Staas & Halsey

[57] ABSTRACT

A compressor for compression-evaporation cooling systems, which requires no moving parts. A gaseous refrigerant inside a chamber is acoustically compressed and conveyed by means of a standing acoustic wave which is set up in the gaseous refrigerant. This standing acoustic wave can be driven either by a transducer, or by direct exposure of the gas to microwave and infrared sources, including solar energy. Input and output ports arranged along the chamber provide for the intake and discharge of the gaseous refrigerant. These ports can be provided with optional valve arrangements, so as to increase the compressor's pressure differential. The performance of the compressor in either of its transducer or electromagnetically driven configurations, can be optimized by a controlling circuit. This controlling circuit holds the wavelength of the standing acoustical wave constant, by changing the driving frequency in response to varying operating conditions.

23 Claims, 7 Drawing Sheets

HIGH FREQUENCY PULSE    DEMODULATED PULSE

STANDING WAVE COMPRESSOR

CROSS REFERENCE TO RELATED APPLICATION

This application is a continuation-in-part of U.S. application Ser. No. 07/256,322, filed Oct. 11, 1988 now abandoned.

BACKGROUND

1. Field of Invention

This invention relates to apparatus for compressing and conveying fluids, and with regard to certain more specific features, to apparatus which are used as compressors in compression-evaporation cooling equipment.

2. Description of Prior Art

Heretofore, nearly all refrigeration and air-conditioning compressors which have found widespread and practical application, required many moving parts. Reciprocating, rotary, and centrifugal compressors, to name a few, all have numerous moving parts. Each of these compressors will consume a portion of energy which serves only to move its parts against their frictional forces, as well as to overcome their inertia. This energy is lost in overcoming the mechanical friction and inertia of the parts, and cannot contribute to the actual work of gas compression. Therefore, the compressor's efficiency suffers. Moving parts also reduce dependability and increase the cost of operation, since they are subject to mechanical failure and fatigue. Consequently, both the failure rate and the energy consumption of a compressor tend to increase as the number of moving parts increases.

Typical refrigeration and air-conditioning compressors must use oils to reduce the friction and wear of moving parts. The presence of oils in contemporary compressors presents many disadvantages. Compressors which need oil for their operation will allow this oil to mix with the refrigerant. The circulation of this oil through the refrigeration cycle will lower the system's overall coefficient of performance, thus increasing the system's energy consumption. As such, the issue of oil-refrigerant mixtures places a restraint on ideal system design.

Another disadvantage of oil-refrigerant mixtures relates to the development of new refrigerants. Non-ozone depleting refrigerants must be developed to replace the chlorofluorcarbon (CFC) family of refrigerants. For a new refrigerant to be considered successful, it must be compatible with compressor oils. Oil compatibility is the subject of performance and toxicity tests which could add long delays to the commercial release of new refrigerants. Hence, the presence of oils in refrigeration and air-conditioning compressors, reduces system efficiency and slows the development of new refrigerants.

In general, much effort has been exerted to design pumping apparatus which lack these traditional moving parts and their associated disadvantages.

Some of these efforts have produced pumps which seek to operate on the pumped medium, using non-mechanical means. Typically these pumps operate by pressurizing the pumped medium using heat, or by exciting the pumped medium by inertia-liquid-piston effects.

Of particular interest is the inertia-liquid-piston type pump of U.S. Pat. No. 3,743,446 to Mandroian, July 3, 1973, which claims to provide a pump whose pumping action is due to the properties of standing acoustical waves. Although the above patent can provide a pumping action, it does not exploit certain modes of operation which can provide greater pressure differentials and improved efficiency. As such, the Mandroian patent does not provide a practical compressor for high pressure applications, such as refrigeration and air-conditioning systems.

Another example is shown in U.S. Pat. No. 3,397,648 to Henderson, Aug. 20, 1968. Therein is disclosed a chamber in which a gas is heated and subsequently expelled through an egress check valve. As the chamber's remaining gas cools the resulting pressure differential causes more gas to be drawn into the chamber through an ingress check valve. This same method is employed in U.S. Pat. No. 3,898,017 to Mandroian, Aug. 5, 1975.

Seldom have any of the above mentioned pumping methods been applied to the field of refrigeration and air-conditioning. One such attempt is seen in U.S. Pat. No. 2,050,391 to Spencer, Aug. 11, 1936. In the Spencer patent, a chamber is provided in which a gaseous refrigerant is heated by spark discharge, and subsequently expelled through an egress check valve, due to the resulting pressure increase. As the chamber's remaining gas cools, the resulting pressure differential causes more gas to be drawn into the chamber through an ingress check valve. This approach results in ionization of the refrigerant, and could cause highly undesirable chemical reactions within the refrigeration equipment. For a practical refrigeration system, such chemical reactions would be quite unsatisfactory.

It is apparent that oil-free refrigeration and air-conditioning compressors, which require few moving parts, have not been satisfactorily developed. If such compressors were available, they could simplify the development of new refrigerants, and offer improved dependability and efficiency, thereby reducing energy consumption.

OBJECTS AND ADVANTAGES

Accordingly, several objects and advantages of the invention are:

to provide a valveless acoustical compressor, by exploiting the properties of ultrasonic non-linear acoustic waves, to provide optional valve arrangements by which to utilize a large portion of the peak-to-peak pressure differential of a standing acoustical wave, to provide a non-mechanical acoustical driver, which exploits the gaseous absorption of electromagnetic energy, thereby entirely eliminating all moving drive parts, to provide an oil-less gas compressor which can develope pressure differentials large enough for refrigeration applications.

Further objects and advantages of the invention will become apparent to the reader from a consideration of the drawings and ensuing description of it.

Figure 1:
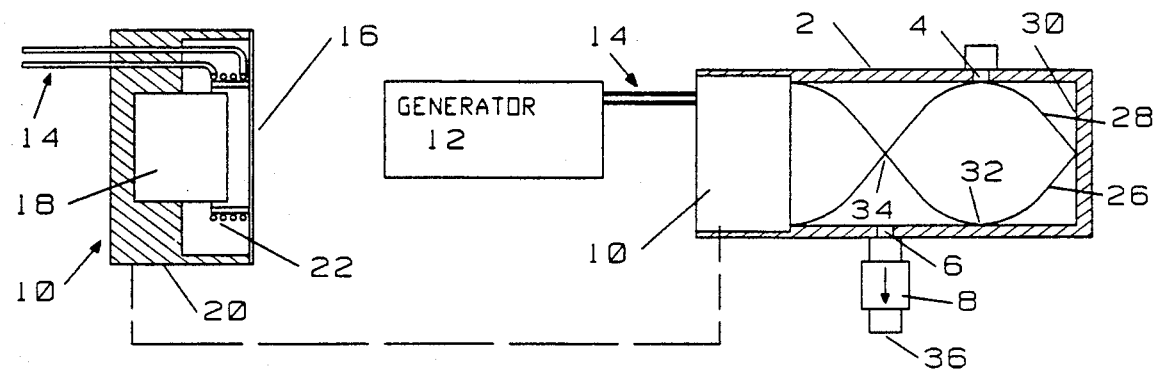
FIG. 1 is a partly schematic, partly sectional view of a mechanically driven embodiment of the invention.

LIST OF REFERENCE NUMERALS 2. chamber
3. output-side conduit
4. input port
5. input-side conduit
6. output port
8. output check valve
10. transducer
12. generator
14. wires
16. transducer diaphragm
18. cylindrical magnet
20. transducer body
22. coil
26. traveling wave
28. reflected wave
30. far wall chamber
32. pressure node, displacement antinode
34. pressure antinode, displacement node
36. compressor outlet
38. input check valve
40. compressor inlet
62. wave shaper
64. pressure sensor
66. analog to digital convertor
68. microprocessor
70. digital to frequency convertor
72. amplifier
74. phase detector
76. loop filter
78. voltage controlled oscillator
80. amplifier
88. signal tap point
90. LASER beam guide
91. pressure sensor
92. LASER
94. LASER beam
96. terminator
98. optical window
100. beam spreader
101. standing acoustical wave
102. wave guide
104. port
106. center conductor
107. coaxial cable
110. coaxial cable
111. screen
112. microwave cavity
113. screen
114. microwave radiator
116. co-axial cable
117. dielectric material
118. center conductor
119. coaxial cable
120. cable shield
124. condenser
126. capillary tube
128. refrigerated space
130. evaporator
131. pressure regulating valve
132. standing wave compressor
134. chamber
136. input port
138. output port
140. chamber flange
142. end flange
144. horn flange
146. ultrasonic horn
148. ultrasonic driver
150. coaxial cable
152. end wall of chamber 134
154. flange bolts

DESCRIPTION AND OPERATION OF INVENTION

Mechanically Driven Embodiments with Valves

FIG. 1 illustrates an embodiment of the present invention. A chamber 2 is provided which has an input port 4 and an output port 6. Output port 6 has a check valve 8 attached thereto, such that any gas/liquid (hereinafter called medium) passing through the output port 6 must also pass through check valve 8 in order to reach outlet 36. Check valve 8 allows flow out of but not into the chamber 2.

Forming one wall of the chamber 2 is a transducer 10 comprising a flexible metallic diaphragm 16, which has a coil 22 attached thereto. Coil 22 encircles the end of a stationary cylindrical magnet 18. Cylindrical magnet 18 is press fitted into the body 20 of transducer 10. The coil 22 of transducer 10 is energized through wires 14 by a generator 12, such as an oscillating circuit. The materials chosen for transducer 10 will depend on the operating pressures of a particular application. Unlike a loudspeaker arrangement, transducer 10 need not have a wide frequency range. As such, it can be constructed of stronger materials which would be mechanically resonant over the narrow frequency range needed. Such a transducer could be constructed to withstand high power acoustic output, and high operating pressures.

In operation, the generator 12 causes the coil 22 to be driven by a periodic waveform of predetermined frequency, which in turn sets up an oscillating magnetic field about coil 22. Due to the alternating polarity of this oscillating field, the coil-diaphragm assembly is alternately repulsed and attracted by the cylindrical magnet 18. Thus, the diaphragm vibrates at a predetermined frequency which causes a traveling wave 26 to be generated in the medium in the chamber 2.

When this traveling wave 26 hits the far wall 30 of chamber 2, it is reflected back as wave 28, 180° out of phase with the initial wave. If the length of chamber 2 is made to be equal to an integer times the wavelength of the traveling wave in the medium divided by four (i.e. $n\lambda/4$, where $\lambda$ the wavelength, and $n=$an integer), then the chamber 2 will act as a resonant cavity and will have a standing wave pattern set up in it. Also, the reflected wave 28, when it reaches the diaphragm wall 16, will again be reflected 180° out of phase, and thus coincident with the initial wave 26. This ongoing reinforcement and resulting resonance, provides a stored-energy effect, as is common to all resonant systems. Since this effect reduces the amount of input energy needed from the transducer and its driver, the pumps efficiency is improved. Thus a standing wave pattern is set up in the chamber 2, which has pressure antinodes or displacement nodes at end wall 30 and at point 34, and pressure nodes or displacement antinodes at diaphragm 16 and at point 32.

The placement of input port 4 and output port 6 is described as follows. Output port 6 is located at pressure antinode 34. The pressure at pressure antinode 34 oscillates above and below the undisturbed pressure of the medium. Also, if the amplitude of these oscillations is large enough, the average pressure at the pressure antinode can rise above the undisturbed pressure of the medium. Input port 4 is located at pressure node 32. The minimum pressure which exists at pressure node 32, is less than the undisturbed pressure of the medium. Check valve 8 provides a rectification of the oscillating pressure at pressure antinode 34. When the pressure at antinode 34 reaches a predetermined value, which is higher than the undisturbed pressure of the medium, check valve 8 opens. Thus some of the medium is allowed to flow out of the chamber 2 by passing in turn through output port 6, check valve 8, and then into outlet 36. When the pressure at antinode 34 drops below the predetermined value, checkvalve 8 closes and prevents the medium from flowing back into chamber 2.

In this way the quantity of medium in chamber 2 is continually reduced, and the pressure at node 32 drops even lower than its normal minimum value, which in turn causes additional medium to be drawn through input port 4 into chamber 2. Thus, when the medium in chamber 2 is excited by the action of transducer 10 and a standing wave pattern is set up therein consisting of pressure nodes and antinodes, some of the medium inside chamber 2 at antinode 34 will be periodically forced out of chamber 2, due in part to check valve 8's rectification of the oscillating pressure at output port 6. In addition, the medium immediately outside chamber 2 at input port 4 will be drawn into chamber 2. In this way, the embodiment of FIG. 1 produces a pressure differential between input port 4 and outlet 36. This pressure differential will be roughly equal to the difference between the peak pressure at antinode 34 and the minimum pressure at node 32.

Figure 2:
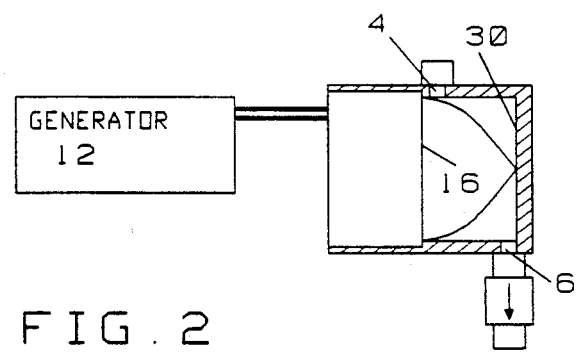
FIG. 2 shows an embodiment which is functionally the same as the embodiment of FIG. 1, but has a minimum of pressure nodes and antinodes.

It should be noted that none of the embodiments of the present invention are limited to a chamber of only one length. Accordingly, for a given wavelength $\lambda$, the length of chamber 2 in FIG. 1 can be any length which equals $n\lambda/4$, so that chamber 2 is not limited to the length $3\lambda/4$. For instance, the embodiment of FIG. 1 could be reduced to that of FIG. 2, and still function in exactly the same manner. FIG. 2 shows an embodiment for the case of $n=1$, which gives a chamber length of $n\lambda/4=\lambda/4$. In this case there is only one pressure node and one pressure antinode, located at the diaphragm 16 and end wall 30 respectively. The location of input port 4 is coincident with said node, and the location of output port 6 is coincident with said antinode. In short, there are any number of possible chambers with lengths that are greater than $\lambda/4$.

Figure 3:
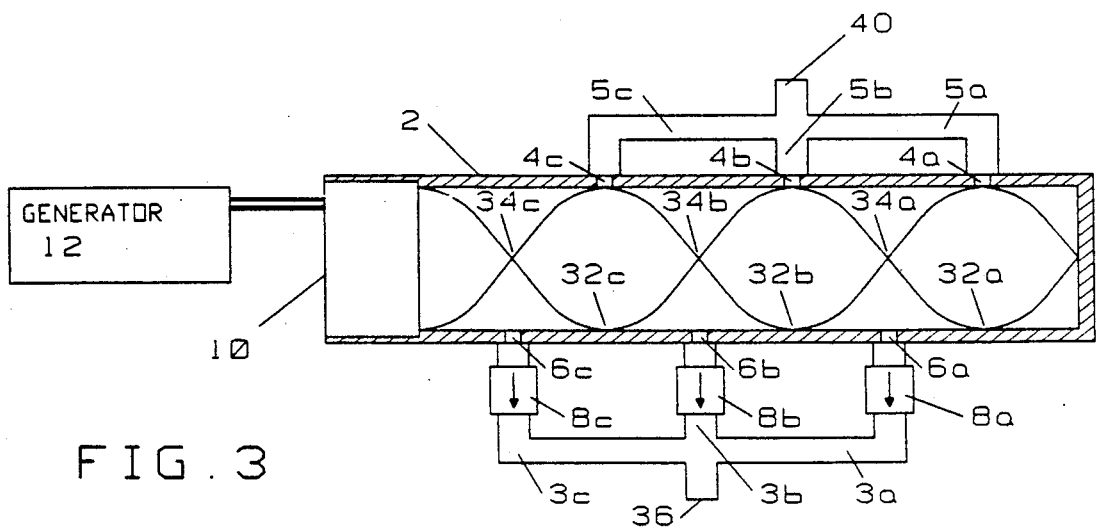
FIG. 3 shows an embodiment which is functionally the same as the embodiment of FIG. 1, but provides additional pressure nodes and antinodes as well as additional input and output ports.

FIG. 3 shows an embodiment of the invention which provides a chamber 2 having multiple input ports 4a, 4b, 4c and multiple output ports 6a, 6b, 6c. Inlet 40 has input ports 4a, 4b, 4c all attached thereto by respective conduits 5a, 5b, 5c, such that any medium passing from input ports 4a, 4b, 4c into chamber 2, must first pass through inlet 40. Output ports 6a, 6b, 6c have check valves 8a, 8b, 8c attached respectively thereto, and said checkvalves are attached to outlet 36 by respective conduits 3a, 3b, 3c, such that any medium passing through the output ports 6a, 6b, 6c must also pass through respective check valves 8a, 8b, 8c in order to reach outlet 36. Check valves 8a, 8b, 8c allow flow out of but not into the chamber 2. Forming one wall of the chamber 2 is a transducer element 10, said element being the same in form and function as the transducer element 10 of FIG. 1. Transducer 10 is energized by a driver 12, such as an oscillating circuit.

The embodiment of FIG. 3 operates in exactly the same manner and according to the same theory and principles as the embodiment of FIG. 1. This can be seen by realizing that the acoustic processes which occur between the single input port 4 and checkvalve 8 of FIG. 1, can also occur between multiple input ports 4a, 4b, 4c and multiple checkvalves 8a, 8b, 8c of FIG. 3.

The number of input ports in FIG. 3 could be reduced to one if so desired.

Figure 4:
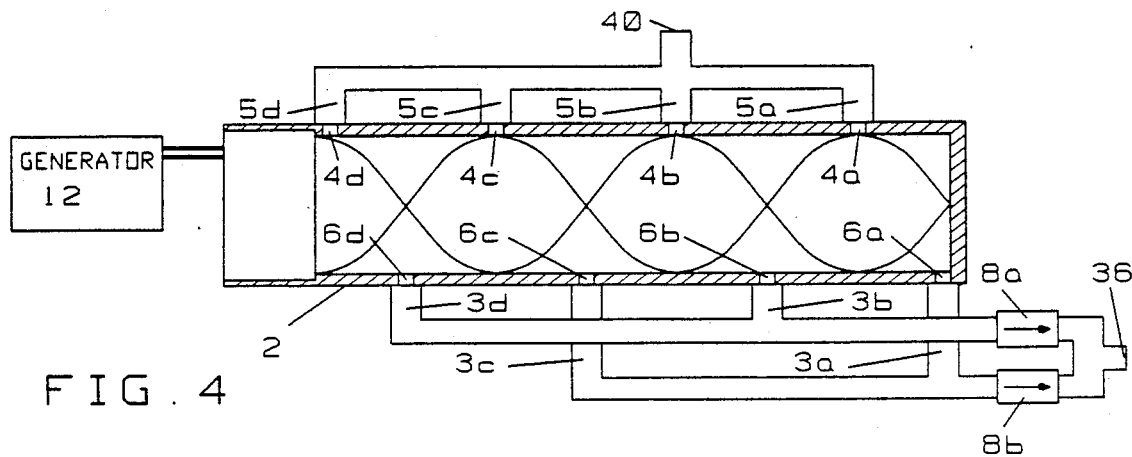
FIG. 4 shows an embodiment that reduces the total number of output check valves needed for a full-wave discharge cycle to a maximum of two.

In FIG. 4 an embodiment of the invention is shown, which limits the number of output check valves needed to two, regardless of the number of output ports. In general, each consecutive pressure antinode is 180° out of pressure-phase with its neighboring pressure antinodes. If antinode n has pressure +P, then antinode n+1 has pressure −P, and antinode n+2 has pressure +P, and so on. In other words, if at a certain time "t" a given antinode's pressure is high, then at that same instant its neighboring antinode's pressure will be low, and the next will be high, and so on. Consequently, since only two pressure-phases exist, all output ports of one phase can be routed through one check valve, and all output ports of the other phase can be routed through another check valve.

FIG. 4 shows inlet 40 with input ports 4a, 4b, 4c, 4d all attached thereto by respective conduits 5a, 5b, 5c, 5d such that any medium passing from input ports 4a, 4b, 4c, 4d into chamber 2, must first pass through inlet 40. Output ports 6a and 6c are attached by respective conduits 3a and 3c to check valve 8b, such that any medium passing through output ports 6a and 6c must also pass through check valve 8b in order to reach outlet 36. Output ports 6b and 6d are attached by respective conduits 3b and 3d to check valve 8a, such that any medium passing through output ports 6b and 6d must also pass through check valve 8a in order to reach outlet 36.

This arrangement can be extended to any number of output ports, such that two check valves will be sufficient regardless of the number of output ports, as long as the two groups of like-pressure-phase output ports are routed through their two respective check valves. This matching of like-pressure-phase output ports is necessary, because if two or more output ports of unlike-pressure-phase were connected together, the medium would tend to flow back and forth between the alternating high and low pressure output ports. Thus, the medium would be allowed to shunt the output check valve and reenter the chamber, so that no pumping would occur. With the exception of this new output check valve arrangement, the embodiment of FIG. 4 operates in the same manner and according to the same theory and principles as the embodiment of FIG. 3. The number of input ports in FIG. 4 could be reduced to one if so desired.

Figure 5:
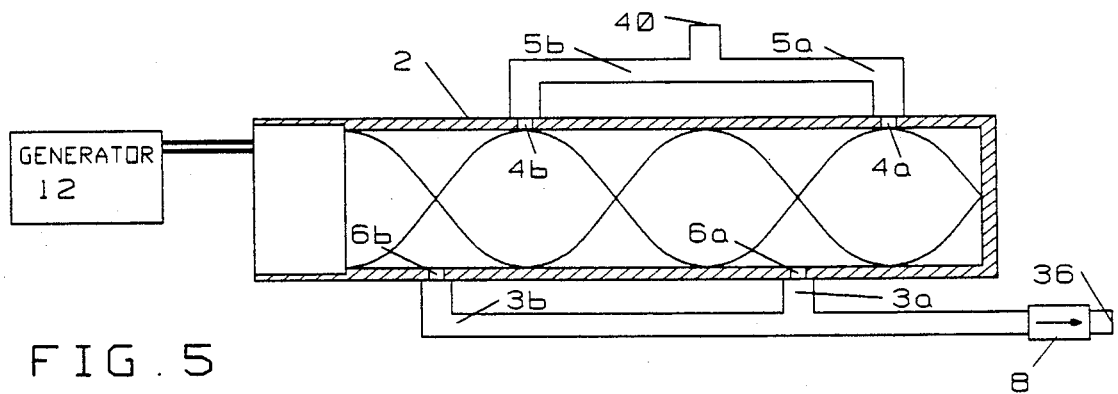
FIG. 5 shows an embodiment of the invention which limits the number of output check valves needed for a half-wave discharge cycle to one.

In FIG. 5 an embodiment of the invention is shown, which limits the number of output check valves needed to one, regardless of the number of output ports. Inlet 40 has input ports 4a and 4b attached thereto by respective conduits 5a and 5b such that any medium passing from input ports 4a and 4b into chamber 2, must first pass through inlet 40. Output ports 6a and 6b are attached by respective conduits 3a and 3b to check valve 8, such that any medium passing through output ports 6a and 6b must also pass through check valve 8 in order to reach outlet 36. This grouping of output ports through a single check valve, is again due to the matching of like-pressure-phase antinodes. This arrangement can be extended to any number of output ports, such that one check valve will be sufficient regardless of the number of output ports, as long as like-pressure-phase output ports are routed through a single check valve. With the exception of this new output check valve arrangement, the embodiment of FIG. 5 operates in the same manner and according to the same theory and principles as the embodiment of FIG. 3. The number of input ports in FIG. 5 could be reduced to one if so desired.

The embodiments of FIG. 3 and FIG. 4 will discharge the medium twice in one period of the standing wave. This full-wave pumping is due to the fact that the output ports are connected to pressure antinodes of both pressure phases. The embodiments of FIGS. 1, 2, and 5 will discharge the medium once in one period of the standing wave. This half-wave pumping is due to the fact that the output ports are connected to pressure antinodes of only one pressure phase.

Figure 6:
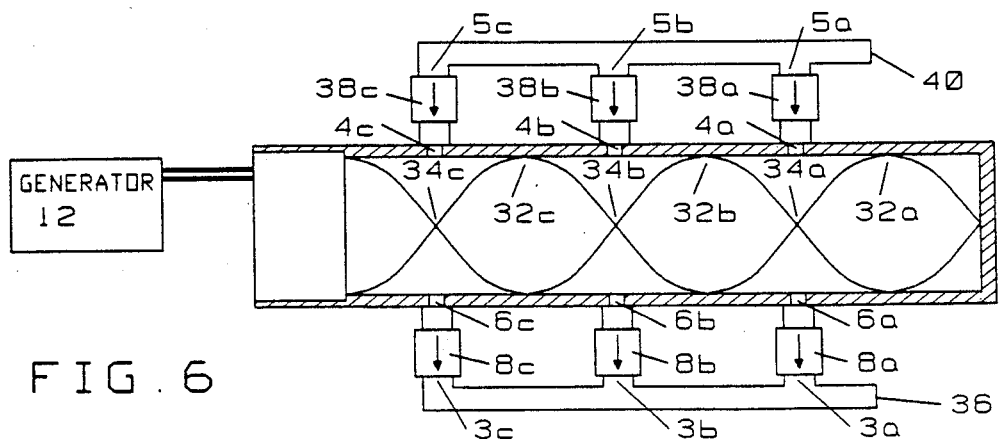
FIG. 6 shows an embodiment of the invention, which locates both input and output ports at the pressure antinodes.

FIG. 6 shows an embodiment of the invention which has a new input port arrangement. A chamber 2 has multiple input ports 4a, 4b, 4c and multiple output ports 6a, 6b, 6c. Output ports 6a, 6b, 6c have check valves 8a, 8b, 8c attached respectively thereto, and said checkvalves are attached by respective conduits 3a, 3b, 3c to outlet 36, such that any medium passing through the output ports 6a, 6b, 6c must also pass through respective check valves 8a, 8b, 8c in order to reach outlet 36. Input ports 4a, 4b, 4c have check valves 38a, 38b, 38c attached respectively thereto, and said checkvalves are attached by respective conduits 5a, 5b, 5c to inlet 40, such that any medium passing into inlet 40, must first pass through respective check valves 38a, 38b, 38c in order to reach respective input ports 4a, 4b, 4c. Check valves 38a, 38b, 38c allow flow into but not out of the chamber 2. Check valves 8a, 8b, 8c allow flow out of but not into the chamber 2. Forming one wall of the chamber 2 is a transducer element 10, said element being the same in form and function as the transducer element 10 of FIG. 1. Transducer 10 is energized by a generator 12, such as an oscillating circuit.

In operation, transducer 10 maintains a standing wave of given wavelength "λ" in the chamber 2, resulting in multiple pressure nodes 32a, 32b, 32c and antinodes 34a, 34b, 34c. Input ports 4a, 4b, 4c and output ports 6a, 6b, 6c are all coincident with respective pressure antinodes 34a, 34b, 34c. When the pressure at any one of the antinodes 34a, 34b, 34c reaches a predetermined value, which is higher than the undisturbed pressure of the medium, its corresponding input check valve closes, and its corresponding output check valve opens. Hence, when the pressure of a antinode goes high, the medium is prevented from leaving the chamber 2 through that antinode's input port, but is allowed to flow out of the chamber 2 by passing through that antinode's output port, then through its output checkvalve, and then through outlet 36.

When the pressure at any one of the antinodes 34a, 34b, 34c drops below a predetermined value, which is lower than the undisturbed pressure of the medium, its corresponding input check valve opens, and its corresponding output check valve closes. Hence, when the pressure of a antinode goes low, the medium is prevented from reentering the chamber 2 through that antinode's output port, but is allowed to flow into the chamber 2 by passing first through inlet 40, then through the antinode's input check valve, and then through its input port into chamber 2.

Thus, when the medium in chamber 2 is excited by the action of transducer 10, a standing wave pattern is set up therein consisting of pressure nodes and antinodes. As a result, the medium at the pressure antinodes 34a, 34b, 34c will be periodically forced out of chamber 2 due to check valve's 8a, 8b, 8c rectification of the oscillating pressure at the output ports 6a, 6b, 6c. In addition, the medium immediately outside chamber 2 at inlet 40 will be periodically drawn into chamber 2 due to check valve's 38a, 38b, 38c rectification of the oscillating pressure at the input ports 4a, 4b, 4c. In this way, the embodiment of FIG. 6 produces a pressure differential between inlet 40 and outlet 36. The number of input and output ports in FIG. 6 could be reduced to one each, or extended to many more.

Figure 7:
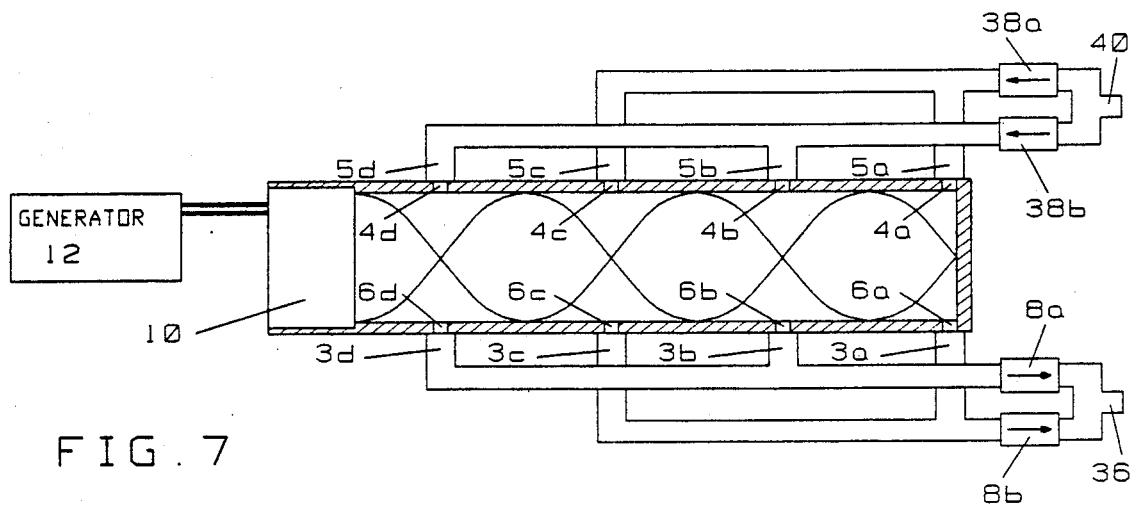
FIG. 7 shows an embodiment that reduces the total number of input and output check valves needed for a full-wave suction and discharge cycle to a maximum of four.

In FIG. 7 an embodiment of the invention is shown which limits the number of input check valves needed to two, and the number of output check valves needed to two, regardless of the number of input and output ports. FIG. 7 shows output ports 6a and 6c attached by respective conduits 3a and 3c to check valve 8b, such that any medium passing through output ports 6a and 6c must also pass through check valve 8b in order to reach outlet 36. Output ports 6b and 6d are attached by respective conduits 3b and 3d to check valve 8a, such that any medium passing through output ports 6b and 6d must also pass through check valve 8a in order to reach outlet 36. Input ports 4a and 4c are attached by respective conduits 5a and 5c to check valve 38a, such that any medium passing through inlet 40, must pass first through check valve 38a in order to reach input ports 4a and 4c. Input ports 4b and 4d are attached by respective conduits 5b and 5d to check valve 38b, such that any medium passing through inlet 40, must pass first through check valve 38b in order to reach input ports 4b and 4d.

This grouping of input and output ports with their respective check valves, is again due to the matching of like-pressure-phase antinodes. This arrangement can be extended to any number of input and output ports, such that only two input check valves and two output check valves will be sufficient regardless of the number of input and output ports, as long as the two groups of like-pressure-phase output ports and the two groups of like-pressure-phase input ports are routed through their four respective check valves. With the exception of this new input and output check valve arrangement, the embodiment of FIG. 7 operates in the same manner and according to the same theory and principles as the embodiment of FIG. 6.

Figure 8:
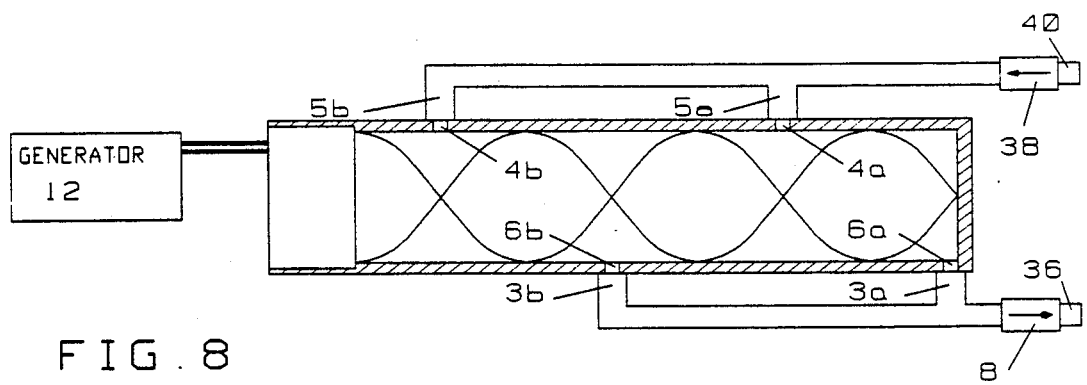
FIG. 8 shows an embodiment that reduces the total number of input and output check valves needed for a half-wave suction and discharge cycle to a maximum of two.

In FIG. 8 an embodiment of the invention is shown which limits the number of input check valves needed to one, and number of output check valves needed to one, regardless of the number of input and output ports. FIG. 8 shows output ports 6a and 6b attached by respective conduits 3a and 3b to check valve 8, such that any medium passing through output ports 6a and 6b must also pass through check valve 8 in order to reach outlet 36. Input ports 4a and 4b are attached by respective conduits 5a and 5b to check valve 38, such that any medium passing through inlet 40, must pass first through check valve 38 in order to reach input ports 4a and 4b. This grouping of input and output ports with their respective check valves, is again due to the matching of like-pressure-phase antinodes.

In FIG. 8, the input and output ports are located at different like-pressure-phase antinodes, but the input and output ports could also be located at the same like-pressure-phase antinodes. This arrangement can be extended to any number of input and output ports, such that one input check valve and one output check valve will be sufficient regardless of the number of input and output ports, as long as the like-pressure-phase output ports and the like-pressure-phase input ports are routed through their two respective check valves. With the exception of this new input and output check valve arrangement, the embodiment of FIG. 8 operates in the same manner and according to the same theory and principles as the embodiment of FIG. 6.

The embodiments of FIG. 6 and FIG. 7 will draw in medium twice during one period of the standing wave, and will also discharge the medium twice in one period of the standing wave. This full-wave pumping is due to the fact that the input and output ports are connected to pressure antinodes of both pressure phases. The embodiment of FIG. 8 will draw in medium once during one period of the standing wave, and will also discharge the medium once in one period of the standing wave. This half-wave pumping is due to the fact that the input ports are connected to pressure antinodes of only one pressure phase and the output ports are connected to pressure antinodes of only one pressure phase.

Many different transducers types can be used in each of the above mechanically driven embodiments. As such, the use of transducer 10 is not intended as a limitation on the invention. Ultrasonic drivers are available which can produce very high pressure acoustic waves. One such driver supplied by Sonic Systems Inc. in Newton, PA. can drive a 1000 psi peak pressure acoustic wave in liquids. The electro-acoustic efficiencies of these drivers can be as high as 90%, depending on the operating conditions.

Figure 9:
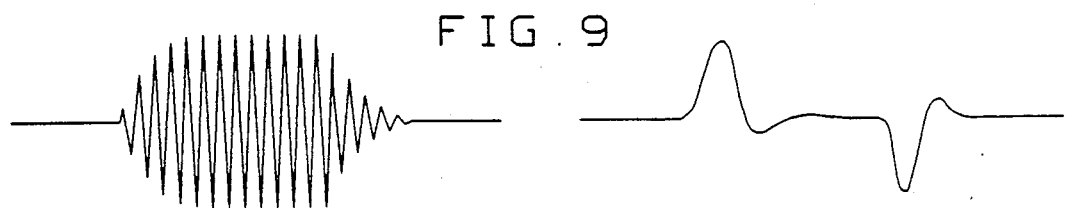
FIG. 9 is an amplitude vrs. time plot, which illustrates the demodulation of high frequency ultrasonic energy into lower frequency pulses.

An ultrasonic driver can also be used in a nonresonant pulsed or modulated mode. By "nonresonant mode," it is meant that the frequency of the driver is not equal to the frequency of the standing acoustical wave. In the pulsed mode, the ultrasonic driver will operate at a frequency which is much higher than the frequency of the standing acoustic wave. The driver is switched rapidly off and on to create a succession of short pulses; each pulse consisting of a short train of high frequency oscillations. FIG. 9 snows the acoustic waveform of a single "high frequency pulse," just after it leaves the driver. After traversing a short distance through the medium, the "high frequency pulse" evolves into the "demodulated pulse." This demodulation occurs when the high frequency acoustic waves are absorbed, leaving only pulses behind. The desired mode of the standing acoustic wave can be excited by the demodulated pulses. One or more ultrasonic drivers could be placed in contact with the gas at one or more pressure antinodes. This placement would allow energy to be added to the standing acoustic wave at more than one location.

In the modulated mode, the output of the ultrasonic driver would be modulated by a lower frequency waveform. Thus a standing acoustical wave could be excited whose frequency would be equal to the modulating frequency, since one positive demodulated pulse is produced per period of the modulating waveform.

The advantage of using these nonresonant driving modes, is that ultrasonic drivers can produce efficient high power acoustical outputs at high frequencies. Thus, the nonresonant driving method provides a way in which these high power sources can be used to drive lower frequency acoustic modes.

Mechanically Driven Embodiments Without Valves

It has long been known, that a standing acoustical wave in a chamber can produce a discernable pressure differential between nodes and antinodes, without the use of valves. Kundt's tube, which uses this effect to measure acoustic wavelengths, has been used since the early 19th century. However, this valveless arrangement would not appear to be a candidate as a refrigeration compressor. To be considered as a gas compressor in general, apparent, is that this minimum pressure which can exist at the pressure nodes is a nonlinear effect. As such, the magnitude of this minimum pressure, relative to the peak acoustic pressure, becomes increasingly large at higher acoustic pressures.

2. At the pressure antinodes, the pressure is oscillating above and below the undisturbed pressure of the gas. For small amplitude waves, the acoustic behavior of the gas is nearly linear, and the pressure oscillations above and below the undisturbed pressure of the gas are approximately equal. As such, the time average pressure at the pressure antinodes would be equal to the undisturbed pressure of the gas. However, in the nonlinear region, these pressure oscillations above and below the undisturbed pressure of the gas, can become increasingly unequal. Consequently, the average pressure at the pressure antinodes can rise above the undisturbed pressure of the gas. The magnitude of this pressure increase, relative to the peak acoustic pressure, becomes increasingly large at higher acoustic pressures.

One contribution to this effect pertains to the formation of shock waves. The presence of large amplitude acoustic waves will lead to shock wave formation. These shock waves can produce large increases in the density and pressure of the gas. Such increases can be many times higher than would be expected from strictly linear considerations.

Another contribution to this effect can be seen by considering what happens when these large amplitude pressure waves are formed. In such a case the acoustic wave's peak pressure can become large when compared to the undisturbed gas pressure. For example, if an acoustic wave having a peak pressure of 5 atmospheres is driven into a gas having an undisturbed gas pressure of 1 atmosphere, rarefactions will be less than compressions, since the rarefractions cannot be less than vacuum. Consequently, an average pressure which is greater than the undisturbed pressure can exist at the pressure antinodes.

3. A practical and efficient way to achieve the high acoustical pressures needed for nonlinear operation, is to use ultrasonic sources. As mentioned above, high pressure high efficiency drivers are commonly available. Nonlinear effects can also be induced at sonic frequencies. However, at these lower frequencies, much larger driver displacements would be required to achieve high pressure waves. An added advantage of ultrasonic drivers is their silent operation.

Due to points 1 and 2 above, the relative pressure differential created between the nodes and antinodes becomes much more significant in the nonlinear mode of operation. In other words, the magnitude of this pressure differential, relative to the peak acoustic pressure of the wave, becomes greater in the nonlinear mode of operation.

In terms of efficiency, the ratio of the node-antinode pressure to the peak-to-peak acoustic pressure, becomes increasingly large in the nonlinear range. Consequently, the valveless embodiment's efficiency improves as it is driven further into the nonlinear region (i.e. higher pressure amplitudes). There will of course be a practical pressure limit, where dissipative forces will offset further efficiency gains. This behavior is most advantageous for compressor applications, since higher pressures represent greater efficiencies for the valveless embodiment.

In summary of the above three points, the ultrasonic nonlinear mode of operation provides a means to substantially increase the efficiency of the valveless embodiment.

Figure 10:
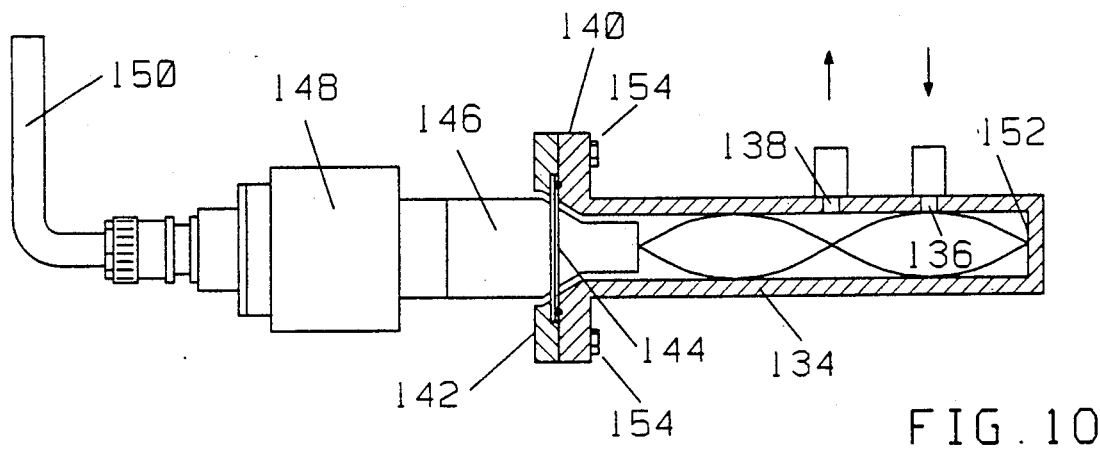
FIG. 10 shows a valveless embodiment of the invention, which operates in an ultrasonic nonlinear mode.

FIG. 10 shows an embodiment of the invention which operates in the ultrasonic non-linear mode, and requires no valves. A chamber 134 is provided whose one end is terminated by end wall 152, and whose other end is provided with a chamber flange 140. Input port 136 is located at a pressure node, and output port 138 is located at a pressure antinode. End flange 142 is fastened to chamber flange 140 by common flange bolts 154. Ultrasonic driver 148 has ultrasonic horn 146 attached thereto. Horn flange 144 is affixed to a nodal plane of ultrasonic horn 146, and horn flange 144 is sandwiched between end flange 142 and chamber flange 140. Coaxial cable 150 supplies R.F. energy to ultrasonic driver 148. An ultrasonic driver and flanged horn arrangement, as shown in FIG. 10, are available from Sonic Systems, Inc. Newtown, PA. Sonic Systems' flanged chamber arrangement can provide a seal for pressures up to 1000 psi.

In operation, ultrasonic driver 148 and ultrasonic horn 146 create a high pressure ultrasonic wave which propagates through the gas in chamber 134. Said ultrasonic wave is reflected from end wall 152. As described in previous embodiments, the frequency of ultrasonic driver 148 and the length of chamber 134 are chosen so that a standing acoustic wave is established as shown in FIG. 10. Due to the nonlinear effects described above, a large pressure differential will be established between pressure nodes and pressure antinodes. Consequently, low pressure gas will be drawn in at input port 136 and high pressure gas will be discharged at output port 138. For compression-evaporation refrigeration systems, the suction line from an evaporator would be connected to input port 136, and the discharge line to a condenser would be connected to output port 138. It should be noted that any number of input and output ports could be used in FIG. 10, and that like-pressure-phase considerations are not required.

The following considerations are pointed out, concerning the various input/output port arrangements of the present invention. It is clear that the points of highest obtainable pressure in the chamber, for valved or valveless arrangements, will be the pressure antinodes, which includes the end walls. As such it is desirable to place both valved and valveless output ports at these positions. It is also clear that the points of lowest pressure in the chamber, for valveless arrangements, will be the pressure nodes. As such it is desirable to place valveless input ports at these points. For valved input ports, a lower pressure may be obtained at the pressure antinodes, including the end walls. Thus, the pressure nodes and antinodes provide ideal locations for input and output ports.

However, it is understood that the invention is not limited to a precise placement of input and output ports with respect to the pressure nodes and antinodes. Many valve and input/output port arrangements have been described above which make efficient use of the pressure effects associated with standing acoustic waves. These pressure effects are minimized or maximized at the pressure nodes and antinodes, but do not exist only at the pressure nodes and antinodes. Rather they can exist, although at reduced levels, at points removed from the pressure nodes and antinodes. In fact, any number of intermediate positions for input and output ports are possible. Although these intermediate positions can result in reduced pressure differentials and efficiencies, they can still provide an operable form of the present invention. Since both input and output ports can be operably moved to many intermediate locations, the exact location of input and output ports is not intended as a limitation on the scope of the present invention.

For all of the valved embodiments, attention must be given to conduit lengths, if valves are to be located some distance from the chamber 2. It is pressure pulses which travel in these conduits. For optimal performance, these pulses should arrive at any common check valve at the same instant. Therefore, conduit lengths should be matched to this end.

A possible source of inefficiency in the present invention relates to an effect called "streaming." Streaming is a flow of the medium within chamber 2 between nodes and antinodes, due to the pressure differential between these nodes and antinodes. It may be possible to minimize streaming losses by proper placement of input and output ports. Such placements could possibly reduce, or alternatively exploit, these streaming effects. Another consideration for minimizing streaming, is to keep the chamber 2 as short as possible. Streaming occurs between each node and antinode. Therefore, by making the chamber 2 only one or two half-wavelengths long, the energy lost to streaming can be minimized.

Electromagnetically Driven Embodiments

FIGS. 14, 15, 17, 18, and 19 illustrate several arrangements for driving the standing acoustical wave with electromagnetic energy. These arrangements differ from each other only in the way in which the electromagnetic energy is directed to the pressure antinodes. For simplicity, FIGS. 14, 15, 17, 18, and 19 omit details of the various input and output ports, and valve arrangements described above. Thus, FIGS. 14, 15, 17, 18, and 19 are only intended to illustrate how electromagnetic energy can be used to establish a standing acoustical wave. It is understood that any of the electromagnetic drive arrangements of FIGS. 14, 15, 17, 18, and 19 can be used with the valved or valveless input and output port arrangements of FIGS. 1, 2, 3, 4, 5, 6, 7, 8, and 10. When used in conjunction with the valveless embodiment, the following electromagnetic drive arrangements can provide a compressor which requires no moving parts.

Figure 14:
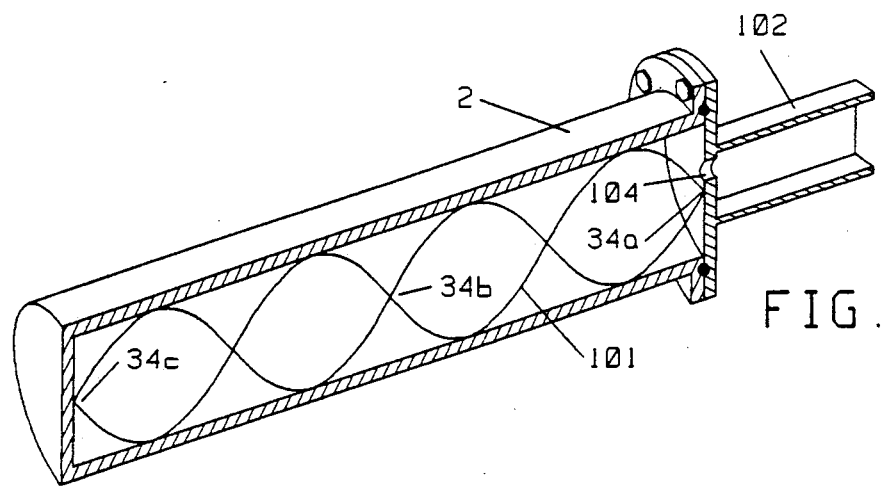
FIG. 14 shows an embodiment of the invention which provides as the driving means, a standing microwave being spatially coincident with the standing acoustical wave.

In FIG. 14 a flanged chamber 2 is provided which has flanged waveguide 102 attached thereto by common flange bolts, such that the microwave energy in waveguide 102 is coupled to chamber 2 through port 104. Port 104 can be pressure sealed with a microwave window made of microwave transparent materials such as Pryex, mica, or certain ceramics. This microwave window would allow microwave energy to pass from waveguide 102 into chamber 2, but would prevent the medium in chamber 2 from entering waveguide 102.

Figure 16:
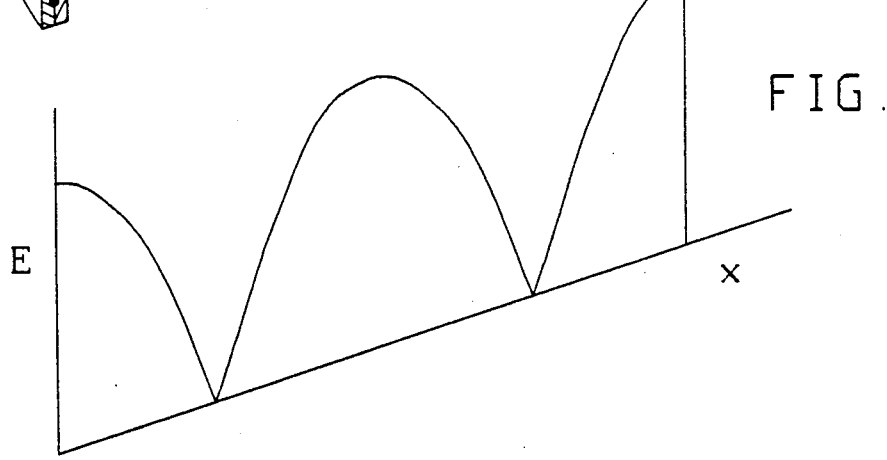
FIG. 16 is a graph which shows an electric energy distribution curve in relation to the chambers of FIG. 14 and FIG. 15.

In operation a microwave source generates microwaves which are guided by waveguide 102 to chamber 2. This microwave energy then enters chamber 2 through port 104. The frequency of the microwave radiation is chosen so that a standing microwave is set up along the length of chamber 2, having an energy distribution similar to the curve of FIG. 16. Thus, the chamber 2 acts as a resonant cavity for the microwave radiation.

The standing microwave's frequency is also chosen so that the regions of maximum energy accumulation, coincide with like-pressure-phase antinodes 34a, 34b, 34c of standing acoustical wave 101. Whether or not these regions of maximum energy accumulation are electric or magnetic, depends on the mode of the standing microwave in chamber 2. The choice of which microwave mode to use, depends on the microwave molecular absorption characteristics of the medium being present in chamber 2. For example, if the molecules have electric di-pole moments, then the regions of maximum energy accumulation should be electric rather than magnetic. Hereinafter, it will be assumed for the sake of example, that these regions of maximum energy accumulation are electric.

When the standing microwave is present in chamber 2, microwave energy is absorbed by the medium primarily within the regions of maximum electric energy accumulation. The microwave source is pulsed or modulated at a rate which excites the desired acoustical mode. By pulsing or modulating the microwave source, the intensity of the standing microwave pattern is caused to vary periodically. This periodic variation of microwave intensity, causes a periodic pressure increase primarily at like-pressure-phase antinodes 34a, 34b, 34c, since these are the points of maximum electric energy accumulation. These periodic pressurizations, create pressure wavefronts which emanate from each of the pressure antinodes 34a, 34b, 34c, thus forming longitudinal waves which propagate bi-directionally along the length of chamber 2.

The microwave source is pulsed or modulated at a rate which keeps the periodic thermal excitation of the medium in phase with the pressure oscillations of like-pressure-phase antinodes 34a, 34b, 34c. In other words, the intensity of the microwave field will be greatest when pressure antinodes 34a, 34b, 34c are at their peak positive pressure, thereby providing the correct reinforcement needed to sustain standing acoustical wave 101. This method could be extended to any number of pressure antinodes, as long as these antinodes are all of like-pressure-phase.

Figure 15:
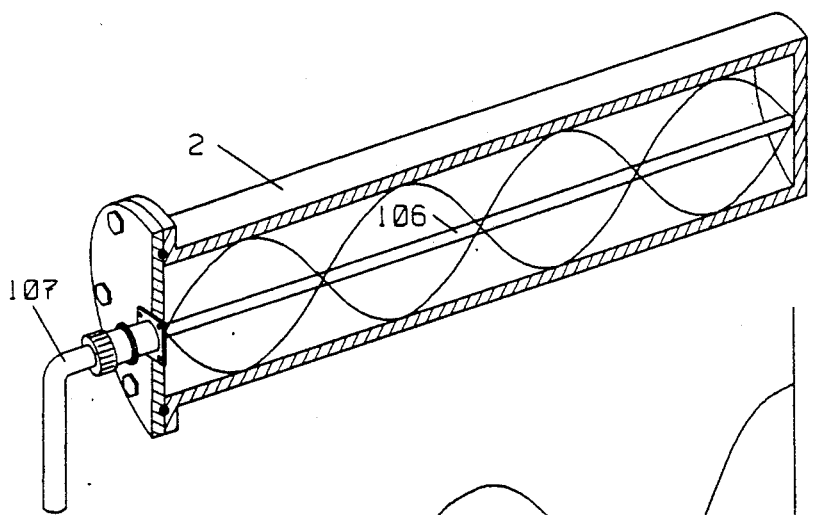
FIG. 15 shows another microwave driving arrangement which provides a standing microwave being spatially coincident with the standing acoustical wave.

FIG. 15 illustrates another method for establishing a standing microwave in chamber 2. This embodiment provides flanged chamber 2 with a center conductor 106, which is located along the axis of chamber 2. Center conductor 106 is electrically connected to the center conductor of coaxial cable 107. The shield of coaxial cable 107, is electrically connected to chamber 2. Center conductor 106 is also electrically connected to the end wall of chamber 2. This arrangement is basically a shorted co-axial cable whose outer shield forms chamber 2. A pulsed or modulated microwave source applies microwave energy of a chosen frequency, by way of coaxial cable 107, to the center conductor 106 and to chamber 2. Said microwave energy causes a standing microwave to be established along the length of chamber 2 between center conductor 106 and chamber 2. This arrangement is similar to that of a standing microwave in a co-axial cable. The standing microwave has an electric energy distribution along the length of chamber 2, which resembles the curve of FIG. 16. Once the standing microwave is so established, this embodiment induces a standing acoustical wave in the same manner and according to the same theory and principles as the embodiment of FIG. 14. The embodiment of FIG. 15 lends itself easily to miniaturization.

It should be noted that the embodiments of FIGS. 14 and 15 are best suited to low pressure applications. At high pressures, a standing microwave pattern will be hard to achieve, due to the large microwave absorption of the gas.

Figure 17:
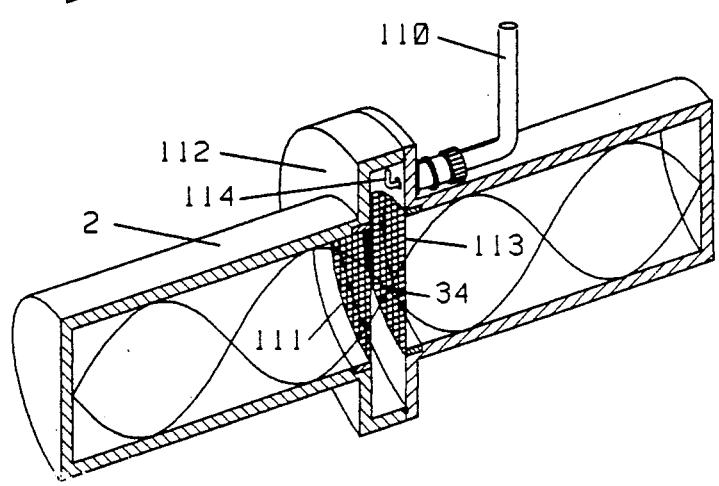
FIG. 17 shows another method for using microwave energy as a means for driving the standing acoustical wave.

The embodiment of FIG. 17 provides a circular microwave cavity 112, which transversely intersects chamber 2 at the pressure antinode 34. To avoid disrupting the standing acoustic wave, microwave cavity 112 can be filled with a solid dielectric material. Such a solid dielectric would fill only the volume of microwave cavity 112 which is not common to chamber 2. Screen 111 and screen 113 are placed transversely across chamber 2, thus extending the boundaries of microwave cavity 112 through chamber 2. Screen 111 and screen 113 help restrict the microwave energy to the area between them, while still allowing axial oscillations of the medium along chamber 2. Microwave cavity 112 has coaxial cable 110 attached thereto, such that the microwave energy carried by coaxial cable 110 is coupled to microwave cavity 112 through microwave radiator 114.

In operation, a microwave source generates microwaves which travel in turn through coaxial cable 110, through microwave radiator 114, and into microwave cavity 112. Screen 111 and screen 113 restrict the microwave energy to a region within chamber 2 corresponding to pressure antinode 34. The microwave source is pulsed or modulated at a rate which excites the desired acoustical mode. This causes a periodic pressure increase which is localized at pressure antinode 34, since this is the region in chamber 2 which is exposed to the microwave energy inside microwave cavity 112. Hence, the periodic microwave pulses create pressure wavefronts which emanate from pressure antinode 34, thus forming longitudinal waves which propagate along the length of chamber 2. The microwave source is pulsed at a rate that will keep the thermal excitation of the medium in phase with the pressure oscillations of the pressure antinode 34. The pulses occur when pressure antinode 34 is at its peak positive pressure, thus providing the correct reinforcement needed to sustain the standing acoustical wave. This arrangement could be extended to any number of pressure antinodes by adding additional microwave cavities. Such additional cavities could be driven by a single microwave source, as long as these cavities are located at antinodes of like-pressure-phase.

Figure 18:
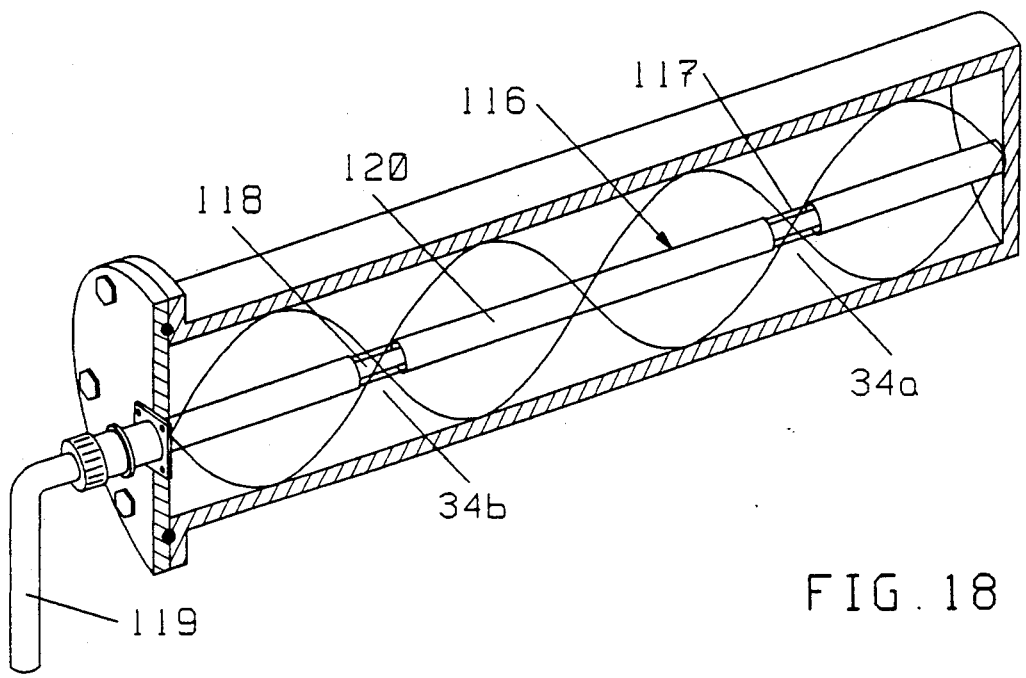
FIG. 18 shows another method for using microwave energy as a means for driving the standing acoustical wave.

In FIG. 18 an embodiment is shown which employs the radiation leakage from a co-axial cable. A flanged chamber 2 is provided with a co-axial cable 116 located along the chamber's axis. Microwave energy is applied to coaxial cable 116, by external coaxial cable 119. Coaxial cable 116 is filled with a solid dielectric 117 between center conductor 118 and shield 120. The coaxial cable's shield 120 is open at points corresponding to like-pressure-phase antinodes 34a and 34b.

In operation a microwave source applies microwave energy of a chosen frequency to center conductor 118 and the co-axial cable shield 120, by way of external coaxial cable 119. This microwave energy travels through coaxial cable 116 and leaks out, due to the open shield, at like-pressure-phase antinodes 34a and 34b. In this way like-pressure-phase antinodes 34a and 34b, will be exposed to microwave energy. The microwave source can be pulsed or modulated at a rate which excites the desired acoustical mode. This causes a periodic pressure increase which is localized at pressure antinodes 34a and 34b, since these are regions in chamber 2 which are exposed to microwave energy. Hence, the pulsed or modulated microwave energy creates pressure wavefronts which emanate from pressure antinodes 34a and 34b, thus forming longitudinal waves which propagate along the length of chamber 2. The microwave source is pulsed or modulated at a rate which will keep the thermal excitation of the medium in phase with the pressure oscillations of pressure antinodes 34a and 34b. The pulses occur when pressure antinodes 34a and 34b are at their peak positive pressure, thus providing the correct reinforcement needed to sustain the standing acoustical wave. This method could be extended to any number of pressure antinodes by adding additional leakage points in the co-axial cable 116, as long as all of these leakage points are located at antinodes of like-pressure-phase.

The microwave source for the embodiments of FIGS. 14, 15, 17, and 18 could be any microwave generator, such as a MAGNETRON or KLYSTRON tube, or could comprise solid state devices such as GUNN or IMPATT diodes, as long as they supply enough power for a given application. Magnetrons are available with pulse repetition rates ranging from 1 kHz to 100 kHz. Therefore, magnetrons could be used to drive standing acoustic waves having frequencies well into the ultrasonic range.

It should be noted that the absorption properties of a gas may be enhanced, by applying static electric or magnetic fields across the gas in the region of electromagnetic absorption.

Figure 19:
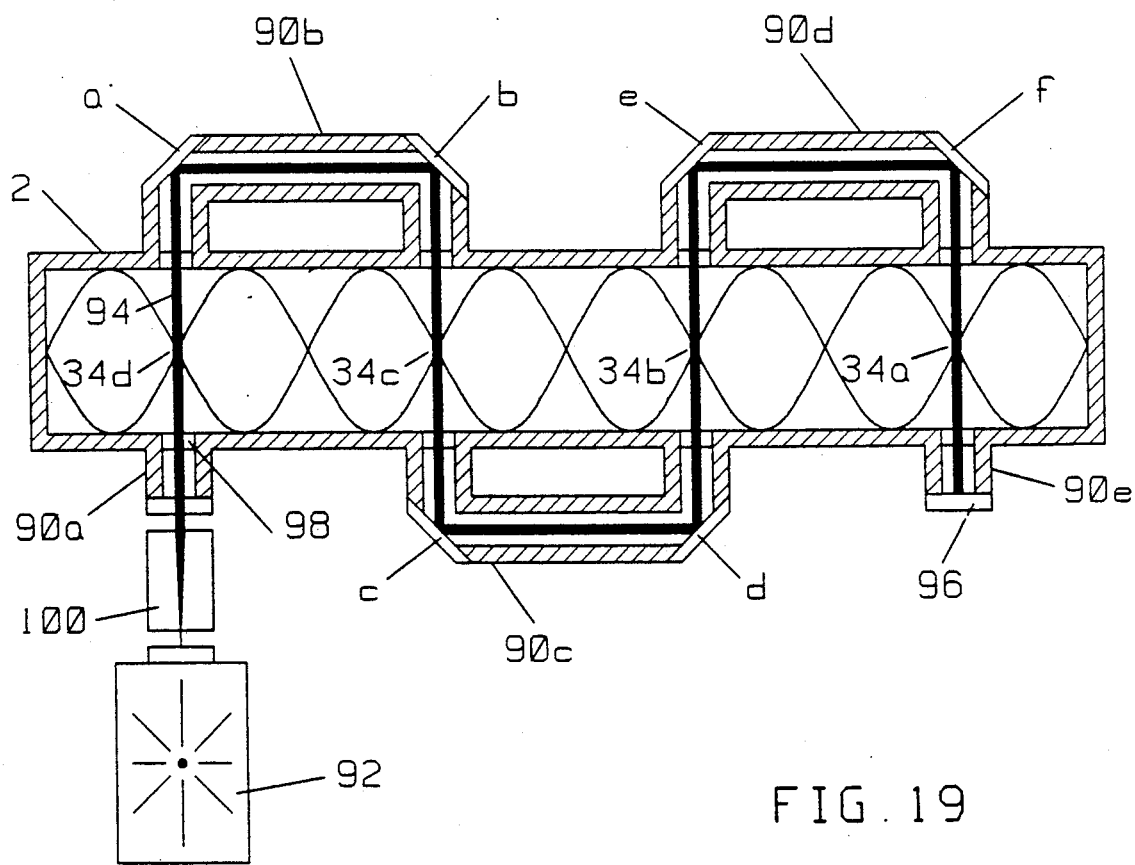
FIG. 19 shows another embodiment of the invention which provides a LASER as a means for maintaining a standing acoustical wave.

FIG. 19 illustrates an embodiment of the invention which provides a LASER driving means for maintaining a standing wave. A chamber 2 is provided which is transversely intersected at its alternate pressure antinodes by LASER beam guides 90a, 90b, 90c, 90d, 90e. The beam guides are equipped with reflective surfaces a, b, c, d, e, f which reflect the LASER beam at 90° angles, so that the LASER beam follows the beam guide. Identical optical windows 98, provide pressure seals between each of the beam guides and the interior of chamber 2. Beam spreader 100 provides control of the LASER beam's cross sectional geometry so as to maximize the medium's exposure to the beam at the pressure antinodes. A LASER 92 emits LASER beam 94, so that LASER beam 94 passes in turn through beam spreader 100 then through optical window 98, and then is directed along the beam guide's 90a interior. The beam 94 then experiences multiple reflections due to reflective surfaces a, b, c, d, e, f and therefore propagates in turn through beam guides 90a, 90b, 90c, 90d, 90e. Beam guide 90e is terminated by reflective surface 96, which reflects the beam through 180° causing it to return along the same path. Alternatively, beam guide 90e could be terminated by an absorber, which would absorb the beam's energy and prevent the beam's reflection.

In operation, the LASER beam 94 is pulsed, and so causes a periodic highly localized pressure increase of the medium. Hence, the periodic LASER pulses create pressure wavefronts which emanate from pressure antinodes 34a, 34b, 34c, 34d and propagate as longitudinal waves along the length of chamber 2. The LASER pulses will have a repetition rate that will keep the instantaneous thermal excitation of the medium in phase with the pressure oscillations of the like-pressure-phase antinodes 34a, 34b, 34c, 34d. The pulses occur when said pressure antinodes are at their peak positive pressure, thus providing the correct reinforcement needed to sustain the standing wave. This method could be extended to any number of pressure antinodes, as long as these antinodes are all of like-pressure-phase. Alternatively, this present embodiment could be reduced to a single beam-chamber intersection, as long as said intersection is located at a pressure antinode, and excites the medium in phase with its pressure oscillations, as described above.

LASER 92 could be a $CO_2$ LASER or an infrared LASER which could directly excite the medium's molecular vibrational states. An alternative driving means would be to locate individual IRLEDs at each of the like-pressure-phase antinodes, as long as they could provide enough power for a particular application. Also, solar energy could provide an abundant source of infrared radiation for driving the embodiment of FIG. 19.

The following considerations will be common to all of the microwave driven embodiments, and to some degree, the infrared driven embodiments. In each of these embodiments, the electromagnetically induced pressure increase of the medium, is due to the electromagnetic excitation of the medium's molecular energy states. Molecular collisions serve to convert the energy of these excited molecular states into the increased kinetic energy of the gas. Most often, these molecular energy states which are responsible for microwave absorption will be rotational, but in some cases may include hindered motions. An example of a hindered motion is the inversion transition of ammonia at 24 GHz. Due to the broadening of the molecular absorption lines at high pressures (i.e. fractions of an atmosphere or higher), a broad range of frequencies can be used. In short, any frequency of electromagnetic radiation can be used, as long as its absorption results in a change of pressure in the gas.

In the case of gases, the microwave absorption at a pressure antinode will be much higher than would be expected from the undisturbed pressure of the gas. In general, the microwave absorption of gases increases with the pressure and density of the gas. During operation, the microwave field is turned on when the pressure at the pressure antinode is at its maximum value, which is higher than the undisturbed pressure of the gas. Therefore, the microwave absorption coefficient of the gas at this instant will be greater than the absorption coefficient for the gas at its undisturbed pressure.

If the microwave power is increased during operation, more microwave power is absorbed, and the gas pressure and density at the pressure antinode will increase for subsequent acoustic cycles. This increase in pressure and density in turn increases the microwave absorption of the gas, and even more power can be absorbed during subsequent microwave pulses. Also, if the microwave driven embodiments are operated at high pressure amplitudes, shock wave formation will begin to occur. Shock wave formation, due to the non-linear effects of large amplitude pressure waves, can cause the pressure and density at the pressure antinodes to increase dramatically. Thus, shock wave formation can further increase the microwave absorption of the gas.

In a paper by W. D. Hershberger (Thermal and Acoustic Effects Attending Absorption of Microwaves by Gases, RCA Review, Vol. 7 No. 3 September 1946), it was shown experimentally that the acoustic power developed, due to microwave absorption, varies with the square of the microwave power. This square law behavior, indicates that the electro-acoustic efficiency improves as the microwave input power is increased. Thus, the efficiency of the microwave driven embodiments will be optimal at high acoustic pressures. Such a behavior is most opportune, since a high pressure amplitude acoustic wave is required for refrigeration applications.

In each of the embodiments of FIGS. 14, 15, 17, 18, and 19, the source of electromagnetic energy is either pulsed or modulated at a rate which excites the desired acoustical mode. At the pressure antinodes, the pressure goes high once during a single cycle of the acoustic mode. If the electromagnetic energy is directed to the pressure antinodes, its pulse or modulation rate would be synchronized with the antinodes pressure cycle. In a paper by Chu and Ying (The Physics of Fluids, V6, p. 1625 1963), it is stated that a heat release whose periodic variation is twice that of the acoustic mode, will drive that mode. In either case, a simple change in modulation or pulse rate would provide proper operation of the present invention.

It is also possible to drive a standing acoustic wave by applying electromagnetic energy of constant intensity to the pressure antinodes, as long as the desired acoustical mode is initially excited. Such an arrangement is described in a paper by Chu (The Physics of Fluids, V6, p. 1638 1963), wherein it is theoretically assumed that a pressure sensitive heat source is used. This means that as the gas pressure at the source increases, the amount of heat added to the gas by the source increases, thus adding energy in phase with the acoustic wave.

Such a pressure sensitive source is naturally accomplished in the present invention, when constant intensity electromagnetic energy is applied. The electromagnetic absorption of a gas varies with the pressure and density of the gas. Since the pressure and density of the gas at the pressure antinodes varies in phase with the acoustic wave, absorption will also vary in phase with the acoustic wave. Thus, energy will be added to the acoustic wave from a constant intensity electromagnetic field, as long as the desired acoustic mode is initially excited. One means by which to initially excite the desired acoustic mode would be to use a mechanical driver, such as a piezoelectric crystal. Such a crystal could form an end wall of chamber 2 in the above figures. In some cases, the sudden application of the constant intensity field may be enough to provide initial excitation of the desired acoustical mode.

A constant field arrangement has the added advantage of not requiring a timing means, for keeping the pulsed or modulated electromagnetic source in phase with the pressure oscillations of the acoustic wave.

The infrared and microwave driving arrangements described above, demonstrate how electromagnetic radiation throughout this broad frequency range, can be used to establish a standing acoustical wave inside an acoustically resonant chamber. However, these arrangements are not presented as being exhaustive techniques in optical, infrared, and microwave technology, since these technologies are rich in many alternative methods for directing electromagnetic radiation to regions inside a chamber. Rather, these examples illustrate how electromagnetic energy, once directed to the proper regions of a chamber, can be used to establish a standing acoustical wave in the chamber.

Valve Types

As described above, some of the embodiments of the present invention use check valves to complement their operation. It is understood that the term "check valve" refers to a function rather than to a specific type of valve. This function is essentially to rectify the oscillating pressure at the pressure antinodes into a net flow. Many different types of these rectifying components could be used; the exact choice of which depends on the particular design requirements of a given application.

In a practical system operating in the kHz acoustic range, reed valves can be employed. Reed valves which are commonly used on reciprocating type compressors, can be obtained from companies such as the Hoerbiger Corp. of America in Pompano Beach, Fla. Such companies supply reed valve assemblies complete with suction and discharge valves. These assemblies are typically sandwiched between the cylinder and head of a reciprocating compressor. A reed valve-head assembly like this could be used, for example, as the end wall 30 of chamber 2 in FIG. 1, since end wall 30 defines a pressure antinode. This valve assembly would replace input port 4 and output port 6 of FIG. 1. However, care must be taken to make the suction and discharge openings small compared to the total area of end wall 30. This will insure adequate reflection of the acoustic wave. Reed valve assembly type 202SLE manufactured by the Hoerbiger Corp. fits these requirements.

Figure 11:
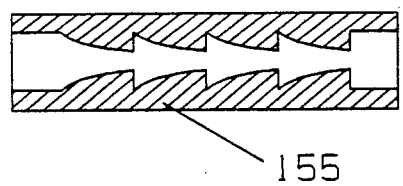
FIG. 11 shows an exemplary check valve which could be used in any of the valved embodiments of the invention.

Another possibility is illustrated in FIG. 11 which shows a series connected restrictive orifice valve 155. This valve will provide a greater resistance to flow in one direction than in the other. Since the pressure at a pressure antinode is oscillating, the resulting oscillatory flow could be rectified by this orifice valve, thus giving a net flow in one direction.

In some applications, it may be desireable to drive a valved embodiment of the invention at an acoustic frequency which is higher than the response time of most standard valves. In such a case, the compressor's performance would suffer if the valves could not open fast enough to allow the medium to pass through. The orifice valve offers one solution to this problem. Another solution would be to employ an activated valve, which would open and close in response to an electrical signal. These activated valves would be operated by a control circuit, which would maintain a constant synchronization with the pressure oscillations of the standing wave. Activated valves could be made to open once per cycle, or once during a plurality of cycles. Such a valve could be activated by a piezoelectric element, which could provide high speed operation. Many other rectifying components may suggest themselves to one skilled in the art.

Instrumentation

Figure 12:
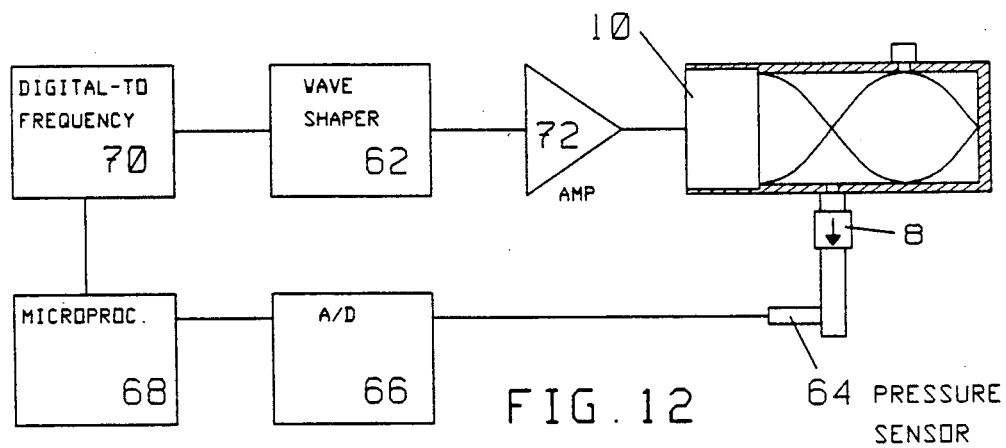
FIG. 12 shows a microprocessor based control circuit which can be used to maintain the proper driving frequency under changing conditions.
Figure 13:
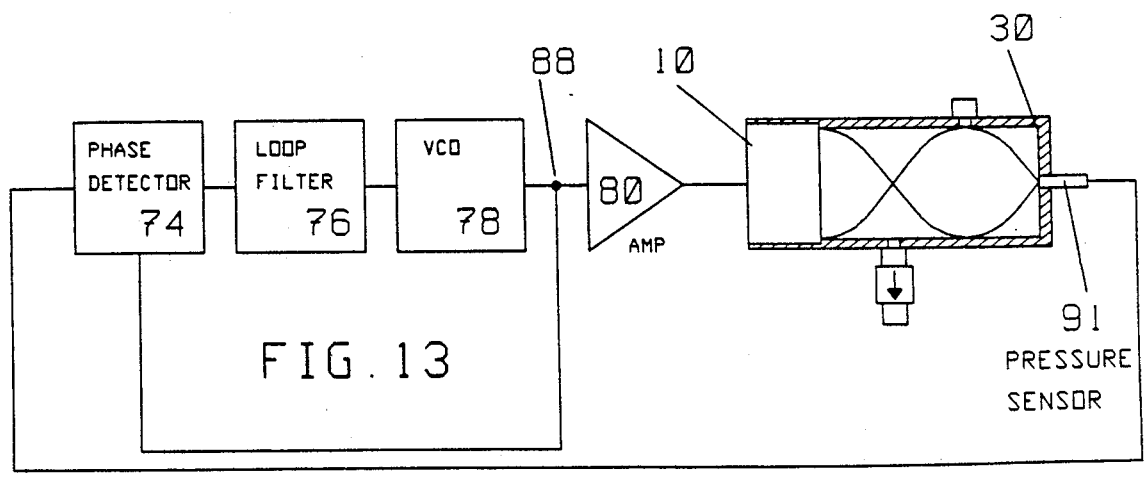
FIG. 13 shows a phase-locked-loop control circuit which can be used to maintain the proper driving frequency under changing conditions.

In all of the mechanically driven embodiments of the present invention, an automated frequency control of the driving system is necessary to assure optimal performance under changing conditions. An acoustic wave's velocity through a gas or liquid medium, changes as a function of conditions such as temperature and pressure. As seen from the relationship $\lambda = v/f$, if the velocity "v" of the wave changes, then the frequency "f" can be changed to keep the wavelength "$\lambda$" constant. As described previously, there are certain preferred alignments between the standing wave's position and the input and output ports, which result in the optimal performance of the present invention. To preserve these alignments during operation, the wavelength must be held constant by varying the frequency in response to changing conditions inside the compressor. FIG. 12 and FIG. 13 illustrate two exemplary circuits, which could be used to maintain the required wavelength of the standing wave. Many other control circuits could be designed by those skilled in the art.

FIG. 12 is a microprocessor based control system, which monitors the compressor's output pressure with pressure sensor 64. The analog pressure signal is converted to digital information by analog-to-digital convertor 66 and is then received by microprocessor 68. If the output pressure at sensor 64 is reduced due to the compressor's changing internal conditions, then in response the microprocessor's software sends digital information to the digital-to-frequency convertor 70. Digital-to-frequency convertor 70 then alters its output frequency to the value which will preserve the desired wavelength of the standing wave. Wave shaper 62 converts the digital-to-frequency convertor's output wave shape into a wave whose shape fits a given design requirement. The output of wave shaper 62 is then amplified by amplifier 72 to a level sufficient for driving transducer 10. In this way the wavelength is maintained at the desired value.

FIG. 13 is a phase-locked-loop control system which compares the phase of the driving waveform at point 88 with the phase of the pressure oscillations at the end wall 30. In the resonant condition, there exists a constant phase difference between the driving waveform at point 88 and the pressure oscillations at the end wall 30. Pressure sensor 91 located in the end wall 30 supplies the oscillating pressure signal to the phase detector 74 to act as the reference signal. The driving signal is tapped off at point 88 and supplied to the phase detector 74 for comparison with the pressure signal. If the wavelength of the standing wave begins to change, then the phase difference between the two signals will begin to change. This phase change is measured by the phase detector 74, which in response sends a direct current voltage through the loop filter 76 to the voltage controlled oscillator 78. This direct current voltage causes voltage controlled oscillator 78 to vary its output frequency until the proper phase difference is regained, thus locking the voltage controlled oscillator to the proper frequency for resonance. The waveform generated by the voltage controlled oscillator 78 is amplified by amplifier 80 to a level necessary for driving transducer 10. A wave shaper could also be added between point 88 and amplifier 80, if so desired.

The control systems of FIG. 12 and FIG. 13 can also be adapted to the electromagnetically driven embodiments of FIGS. 14, 15, 17, 18 and 19. In this case, the pulse repetition rate or the modulation frequency would be varied in response to system changes.

Other parameters of the present invention could be used as control feedback for maintaining resonance. One such parameter is the current which drives transducer 10. Since the transducer 10 draws less current at resonance, a minimum value of this current for a given output pressure would indicate resonance.

Alternatively, if transducer 10 were a piezoelectric crystal, then the chamber, the acoustic wave, and the crystal, could all act together as the frequency determining element of a resonant circuit. For a given temperature and pressure, the transducer would tend to oscillate at the chamber's acoustic resonance, thereby locking the resonant circuit's frequency at the chamber's resonance.

Description of Refrigeration and Air-conditioning Applications

Figure 20:
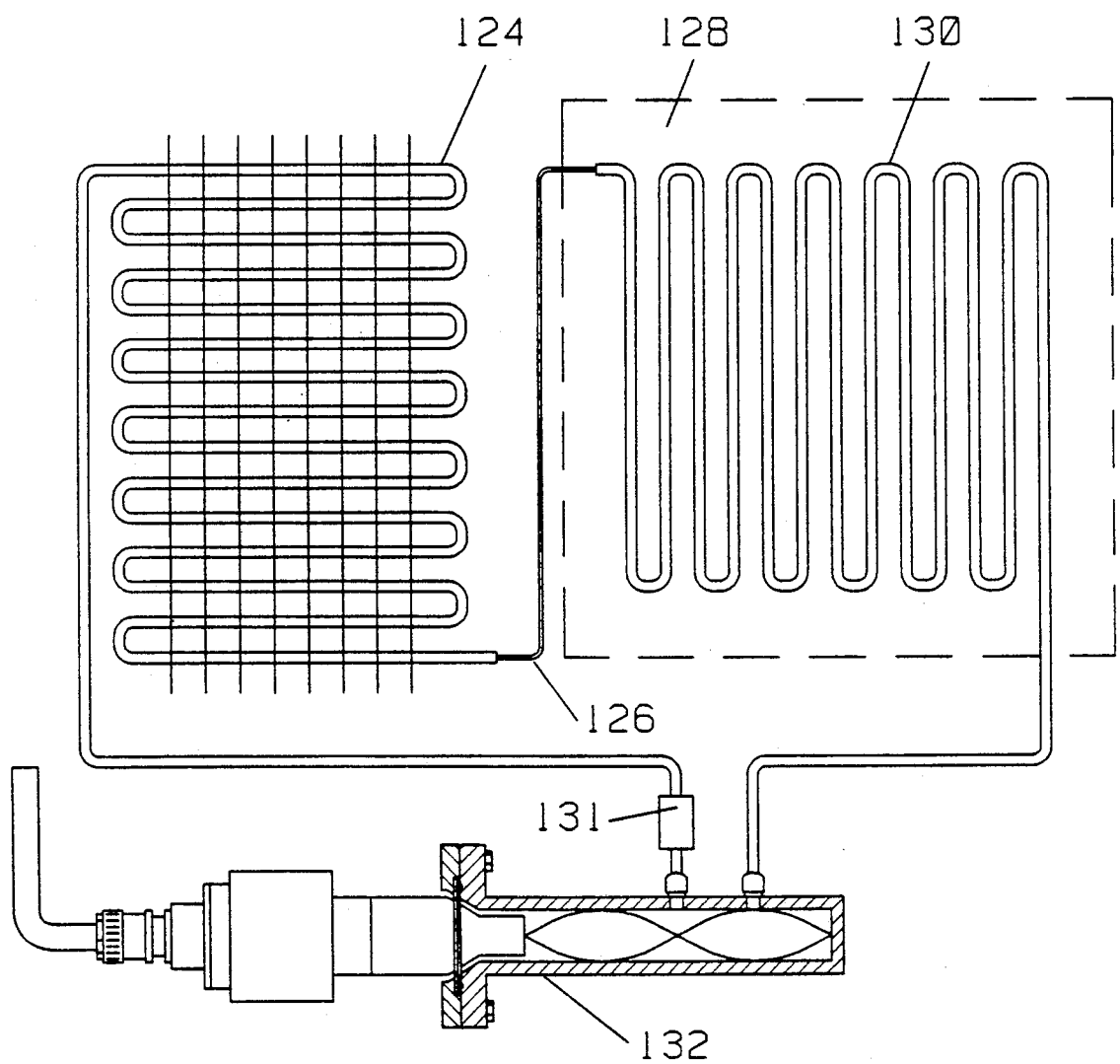
FIG. 20 illustrates the standing wave compressor as it is used in a typical compression-evaporation cooling system.

FIG. 20 illustrates the use of the present invention as a compressor, in a compression-evaporation refrigeration system. In FIG. 20 the present invention is connected in a closed loop, consisting of condenser 124, capillary tube 126, and evaporator 130. This arrangement constitutes a typical compression-evaporation system, which can be used for refrigeration, air-conditioning, or other cooling applications.

In operation, a pressurized liquid refrigerant flows into evaporator 130 from capillary tube 126, therein experiencing a drop in pressure. This low pressure liquid refrigerant inside evaporator 130 then absorbs its heat of vaporization from the refrigerated space 128, thereby becoming a low pressure vapor. Standing wave compressor 132 provides a suction, whereby the low pressure vaporous refrigerant is drawn out of evaporator 130 and into the standing wave compressor 132. This low pressure vaporous refrigerant is then acoustically compressed by standing wave compressor 132, and subsequently discharged into condenser 124 at a higher pressure and temperature. As the high pressure gaseous refrigerant passes through condenser 124, it gives up heat and condenses into a pressurized liquid once again. This pressurized liquid refrigerant then flows through capillary tube 126, and the thermodynamic cycle repeats.

Standing wave compressor 132 in FIG. 20, is shown to be the ultrasonic nonlinear embodiment of the present invention. However, various embodiments of the present invention can be used in the system of FIG. 20; the description and operation of which has been given above. The embodiment which is chosen, will depend on the design needs of a particular application. For example, the ultrasonic nonlinear mode embodiment of FIG. 10, could provide silent operation for residential refrigerators. In general, the embodiments of the present invention can provide good design flexibility for a given system.

For some applications, it may be desirable to enclose the standing wave compressor, including the driving means, in a hermetic vessel.

When designing a system like that of FIG. 20, some advantage will be found in the choice of a proper base pressure of the standing wave compressor 132. This base pressure is the undisturbed pressure which exists inside the standing wave compressor 132, in the absence of an acoustic wave. Standing wave compressor 132 creates a pressure differential whose suction pressure is lower than the base pressure, and whose discharge pressure is higher than the base pressure. Thus to make the suction pressure equal to the pressure of evaporator 130, the base pressure should lie somewhere between the pressures of evaporator 130 and condenser 124. To provide added control over the base pressure of standing wave compressor 132, a pressure regulating valve 131 can be added to the discharge side of standing wave compressor 132. Pressure regulating valve 131 would limit the gas discharge of standing wave compressor 132. If pressure regulating valve 131 were constricted during operation, then for a brief period more gas would be drawn into standing wave compressor 132 than would be discharged. Therefore, the base pressure would rise, and a new equilibrium base pressure would be reached, which would be higher than the previous base pressure. Automatic control of pressure regulating valve 131 could be provided.

Solar energy comprises an excellent infrared source for driving the embodiment of FIG. 19. A simple solar arrangement could comprise a mirror for intensifying the sun's radiation, and a beam chopper to provide a pulse beam. This pulsed beam could be fed directly into beam guide 90a of FIG. 19.

Alternatively, the standing wave compressor can be driven by constant intensity electromagnetic energy, although the desired acoustical mode may need to be initially excited. Initial excitation of the desired acoustical mode, could be accomplished by a mechanical driver, such as the ultrasonic driver shown in FIG. 10. In some cases, the sudden exposure to the constant intensity electromagnetic energy may be enough to initiate the desired acoustical mode. Self initiation of the desired acoustic mode becomes more reliable if more than one pressure antinode is driven by the constant intensity source. Multiple antinode driving would tend to lock in the desired mode. Constant intensity driving provides great simplicity for the solar driven embodiments, since the pulsing means can be eliminated. In general, a pulsed source would represent greater efficiency. However, since solar energy is free, the added simplicity of a constant source becomes more desirable.

Several solar driven standing wave compressors could be placed in series to provide higher pressure differentials, or in parallel to provide higher net flow rates. The solar driven embodiments could also find applications in outer space, where intense infrared energy from the sun is plentiful.

A mechanical drive could be combined with a solar drive to provide a hybrid heatpump system. For example, the standing wave compressor could be driven by both an ultrasonic driver, and by solar energy. In the absence of sunlight the ultrasonic driver would provide most of the energy needed to drive the standing wave compressor. On sunny days, the energy consumption of the ultrasonic driver could be supplemented by solar energy. The solar infrared energy would be directed to the pressure antinodes as described above. This hybrid drive standing wave compressor could operate in three modes: (1) all ultrasonically driven, (2) all solar driven, (3) both ultrasonically and solar driven at the same time. Mode selection could be varied automatically in response to ongoing operating conditions.

Alternatively, a solar driven standing wave compressor could act as a pre-compressor for other conventional compressors, thereby reducing the pressure differential which must be provided by the conventional compressor, during sunlit hours.

Since the standing wave compressor eliminates all moving parts which require oil, a compression-evaporation system can be operated with an oil-free refrigerant. Thus, the many system design problems associated with oils can be eliminated, and a compression-evaporation system could approach more closely the efficiency of an ideal refrigeration cycle.

Compression-evaporation cooling equipment can take many forms and is found in many different applications and industries. As such, the standing wave compressor is not limited only to those cooling applications described above, but can be adapted to any number of applications.

Thus the reader can see that the present invention successfully provides a simple yet efficient and adaptive compressor, which does not suffer from the many disadvantages of numerous moving parts. In particular, the reader can see that a valveless version of the present invention can operate with increased efficiency in its ultrasonic nonlinear mode. The reader can also see that the electromagnetically driven embodiments, provide a compressor which eliminates all internal moving parts, and can be driven by sources of microwave and infrared energy, including solar energy. Finally, the reader can see that the present invention provides an oiless compressor which is particularly well suited for compression-evaporation cooling systems.

While the above description contains many specifications, these should not be construed as limitations on the scope of the invention, but rather as an exemplification of one preferred embodiment thereof. Many other variations are possible, and may readily occur to those skilled in art. For example, more than one transducer could be used in the embodiments of FIGS. 1, 2, 3, 4, 5, 6, 7, 8, and 10, and the frequency and phase of these two transducers could be manipulated with respect to each other to create greater pressure differentials, beat frequency phenomenon, combinations of standing and traveling waves, and other effects which may prove useful in various applications. A single transducer could be placed in an intermediate position in the chamber, such that standing acoustic waves could be set up on both sides of the transducer. Also, the waveforms that drive either single or multiple transducers need not be sinusoidal, but could be sawtooth, square wave, pulsed, or any waveform that satisfies a given design need.

In addition, the chamber 2 need not be cylindrical, but can be any geometry which will support a standing acoustical wave. A toroidal chamber could be used for the electromagnetically driven embodiments. For a toroidal chamber, the waves would propagate bi-directionally around the torus, thus forming a standing wave. Unlike a cylindrical chamber, there would be no reflections, since the toroidal chamber is continuous. Also, for a toroidal chamber the electromagnetic energy would still be directed to the pressure antinodes.

Also, various features could be added to the control instrumentation. For example, the driving system's power could be varied in response to changing cooling load demands. This feature would provide all of the advantages associated with contemporary "variable speed compressors."

Input and output ports may also be formed in different geometries, and thus could define openings in chamber 2 such as a series of circular holes, slits, indentations, or separate adjoining chambers. Alternatively, coaxial tubes with periodic openings at the nodes and antinodes could be used to locate input and output ports along the axis of the chamber 2.

Finally, several units can be connected so that their inputs and outputs form series and/or parallel combinations, and their chambers could intersect at common pressure antinodes, all of which can provide greater pressure differentials and improve volume handling capabilites. Accordingly, the scope of the invention should be determined not by the embodiments illustrated, but by the appended claims and their equivalents.

What is claimed is:
1. A refrigerant compressor comprising:
   (a) a chamber for receiving a gaseous refrigerant to be compressed and discharged;
   (b) a driving means for establishing a traveling acoustic wave in said gaseous refrigerant in said chamber;
   (c) means including said driving means and said chamber for converting said traveling acoustic wave to a standing acoustic wave in said gaseous refrigerant in said chamber having one or more pressure nodes and one or more pressure antinodes therein;
   (d) one or more input ports in said chamber;
   (e) one or more output ports in said chamber.

2. The refrigerant compressor of claim 1 further including:
   (a) each said one or more input ports being located at said pressure nodes;
   (b) each said one or more output ports being located at said pressure antinodes, and each said one or more output ports having a individual output rectifying means;
   (c) said individual output rectifying means allowing said gaseous refrigerant to exit but not enter said chamber.

3. The refrigerant compressor of claim 1 further including:
   (a) each said one or more input ports being located at said pressure nodes;
   (b) said one or more output ports comprising a first output port group with the individual output ports of said first output port group being located at the individual antinodes of a first like-pressure-phase, and a second output port group with the individual output ports of said second output port group being located at the individual antinodes of a second like-pressure-phase;
   (c) a first conduit means which routes all said individual output ports of said first output port group through a first output rectifying means, and a second conduit means which routes all said individual output ports of said second output port group through a second output rectifying means;
   (d) said first output rectifying means allowing said gaseous refrigerant to exit but not enter said chamber, and said second output rectifying means allowing said gaseous refrigerant to exit but not enter said chamber.

4. The refrigerant compressor of claim 1 further including:
   (a) each said one or more input ports being located at said pressure nodes;
   (b) said one or more output ports comprising a output port group with the individual output ports of said output port group being located at the individual antinodes of a like-pressure-phase;
   (c) a conduit means which routes all said individual output ports of said output port group through a output rectifying means;
   (d) said output rectifying means allowing said gaseous refrigerant to exit but not enter said chamber.

5. The refrigerant compressor of claim 1 further including:
   (a) each said one or more input ports being located at said pressure antinodes, and each said one or more input ports having a individual input rectifying means;
   (b) each said one or more output ports being located at said pressure antinodes, and each said one or more output ports having a individual output rectifying means;

(c) said individual input rectifying means allowing said gaseous refrigerant to enter but not exit said chamber, and said individual output rectifying means allowing said gaseous refrigerant to exit but not enter said chamber.

6. The refrigerant compressor of claim 1 further including:
(a) said one or more input ports comprising a first input port group with the individual input ports of said first input port group being located at the individual antinodes of a first like-pressure-phase, and a second input port group with the individual input ports of said second input port group being located at the individual antinodes of a second like-pressure-phase;
(b) said one or more output ports comprising a first output port group with the individual output ports of said first output port group being located at the individual antinodes of said first like-pressure-phase, and a second output port group with the individual output ports of said second output port group being located at the individual antinodes of said second like-pressure-phase;
(c) a first input conduit means which routes all said individual input ports of said first input port group through a first input rectifying means, and a second input conduit means which routes all said individual input ports of said second input port group through a second input rectifying means;
(d) a first output conduit means which routes all said individual output ports of said first output port group through a first output rectifying means, and a second output conduit means which routes all said individual output ports of said second output port group through a second output rectifying means;
(e) said first and second input rectifying means allowing said gaseous refrigerant to enter but not exit said chamber, and said first and second output rectifying means allowing said gaseous refrigerant to exit but not enter said chamber.

7. The refrigerant compressor of claim 1 further including:
(a) said one or more input ports comprising a input port group with the individual input ports of said input port group being located at any of the individual antinodes of a like-pressure-phase;
(b) said one or more output ports comprising a output port group with the individual output ports of said output port group being located at any of the individual antinodes of a like-pressure-phase;
(c) a input conduit means which routes all said individual input ports of said input port group through a input rectifying means;
(d) a output conduit means which routes all said individual output ports of said output port group through a output rectifying means;
(e) said input rectifying means allowing said gaseous refrigerant to enter but not exit said chamber, and said output rectifying means allowing said gaseous refrigerant to exit but not enter said chamber.

8. The refrigerant compressor of claim 1 wherein:
said driving means comprises one or more ultrasonic drivers, said one or more ultrasonic drivers emitting periodic ultrasonic energy, said periodic ultrasonic energy having an acoustic frequency which is higher than the acoustic frequency of said standing acoustic wave,
whereby said periodic ultrasonic energy is demodulated into pulses by said gaseous refrigerant, said pulses having an acoustic frequency which is less than the acoustic frequency of said periodic ultrasonic energy, with said pulses acting to drive said standing acoustic wave.

9. The refrigerant compressor of claim 1 wherein:
said driving means comprises a ultrasonic driver, said ultrasonic driver emitting ultrasonic energy, said ultrasonic energy having an acoustic frequency which is equal to the acoustic frequency of said standing acoustic wave, said ultrasonic driver generating said traveling wave of pressure amplitude sufficient for inducing nonlinearities, and each said one or more input ports being located at said pressure nodes, and each said one or more output ports being located at said pressure antinodes,
whereby the compressor operates in a ultrasonic nonlinear mode.

10. The refrigerant compressor of claim 1 wherein:
said driving means comprises a electromagnetic energy source, and a electromagnetic energy guiding means, said electromagnetic energy source providing periodic electromagnetic energy, and said electromagnetic energy guiding means guiding said periodic electromagnetic energy to one or more regions within said chamber,
whereby the exposure of said one or more regions to said periodic electromagnetic energy establishes said traveling waves which emanate from said one or more regions and propagate through said gaseous refrigerant in said chamber.

11. The refrigerant compressor of claim 1 wherein:
said driving means comprises a electromagnetic energy source, and a electromagnetic energy guiding means, said electromagnetic energy source providing continuous electromagnetic energy, and said electromagnetic energy guiding means guiding said continuous electromagnetic energy to one or more regions within said chamber,
whereby exposure of said one or more regions to said continuous electromagnetic energy establishes said traveling waves which emanate from said one or more regions and propagate through said gaseous refrigerant in said chamber.

12. The refrigerant compressor of claim 1 wherein:
said driving means comprises a electromagnetic energy source, and a electromagnetic energy guiding means, and a mode excitation means, said electromagnetic energy source providing continuous electromagnetic energy, and said electromagnetic energy guiding means guiding said continuous electromagnetic energy to one or more regions within said chamber, and said mode excitation means providing initial excitation of the desired acoustic mode within said chamber,
whereby after initial excitation of the desired acoustic mode, exposure of said one or more regions to said continuous electromagnetic energy establishes said traveling waves which emanate from said one or more regions and propagate through said gaseous refrigerant in said chamber.

13. A refrigerant compressor comprising:
a chamber for holding a fluid refrigerant to be compressed, said chamber includes at least one inlet, and at least one outlet; and
driving means for establishing a traveling wave in the fluid refrigerant in said chamber, said driving means and said chamber converting the traveling wave into a standing wave in the fluid refrigerant in said chamber, so that the fluid refrigerant is compressed.

14. A refrigerant compressor as set forth in claim 13, wherein the standing wave in the fluid refrigerant has at least one pressure node and at least one pressure antinode.

15. A refrigerant compressor as set forth in claim 14, wherein said at least one inlet of said chamber is located at said at least one pressure node, and said at least one outlet of said chamber is located at said at least one pressure antinode.

16. A refrigerant compressor as set forth in claim 15, further comprising rectifying means for allowing the fluid refrigerant to exit said chamber via said at least one outlet but for preventing the fluid from entering said chamber via said at least one outlet port.

17. A refrigerant compressor as set forth in claim 16, wherein said rectifying means comprises a reed valve.

18. A refrigerant compressor as set forth in claim 13, wherein said fluid refrigerant comprises a gaseous refrigerant.

19. A refrigerant compressor as set forth in claim 13, wherein said driving means comprises an ultrasonic driver for emitting periodic ultrasonic energy into said chamber, wherein the periodic ultrasonic energy has an acoustic frequency which is higher than the acoustic frequency of the standing wave, wherein the periodic ultrasonic energy is demodulated into pulses by the fluid refrigerant, and wherein the pulses having an acoustic frequency which is less than the acoustic frequency of the periodic ultrasonic energy, so that the pulses drive the standing wave.

20. A refrigerant compressor as set forth in claim 13, wherein said driving means comprises an electromagnetic energy source, coupled to said chamber, for providing periodic electromagnetic energy to at least a region within said chamber, so that the periodic electromagnetic energy establishes the traveling wave in the fluid refrigerant.

21. A compressor comprising: a chamber for holding a refrigerant to be compressed, said chamber includes at least one inlet, and at least one outlet; and driving means for applying electromagnetic energy to the refrigerant, said driving means and said chamber setting up a standing wave in the refrigerant in said chamber, so that the refrigerant in said chamber is compressed.

22. A compressor set forth in claim 21, wherein the applied electromagnetic energy is time varying electromagnetic energy.

23. A compressor as set forth in claim 21, wherein the applied electromagnetic energy is continuous electromagnetic energy.

* * * * *

UNITED STATES PATENT AND TRADEMARK OFFICE
CERTIFICATE OF CORRECTION

PATENT NO. : 5,020,977

DATED : JUNE 4, 1991

INVENTOR(S) : TIMOTHY S. LUCAS

It is certified that error appears in the above-identified patent and that said Letters Patent is hereby corrected as shown below:

Col. 5, line 51, "pumps" should be --pump's--.

Col. 11, line 2, "general, apparent" should be --general, a device must efficiently produce high pressure differentials.

By operating the present invention in its ultrasonic nonlinear mode, valveless operation is made practical. The following advantages are realized by operating the present invention in its ultrasonic nonlinear mode:

1. Nonlinear effects, or "higher ordered" effects, can usually be ignored for small amplitude acoustic waves. However, at large amplitudes these nonlinear effects become much more significant.

As mentioned previously, it is an empirical fact that the pressure nodes can be points of minimum pressure in a standing acoustic wave. What is not apparent,--;

line 38, "rarefractions" should be --rarefactions--.

UNITED STATES PATENT AND TRADEMARK OFFICE
CERTIFICATE OF CORRECTION

PATENT NO. : 5,020,977
DATED : JUNE 4, 1991
INVENTOR(S) : TIMOTHY S. LUCAS

It is certified that error appears in the above-identified patent and that said Letters Patent is hereby corrected as shown below:

Col. 26, line 65, "includes" should be --including--.

Col. 27, line 18, "outlet port." should be --outlet.--.

Col. 28, line 14, after "comprising:", start a new paragraph, with paragraph indentation, beginning with "a chamber for holding";
line 15, "includes" should be --including--.

Signed and Sealed this

Tenth Day of November, 1992

*Attest:*

DOUGLAS B. COMER

*Attesting Officer*     Acting Commissioner of Patents and Trademarks